(12) United States Patent
Matsuno et al.

(10) Patent No.: US 10,549,509 B2
(45) Date of Patent: Feb. 4, 2020

(54) METHOD OF MANUFACTURING A POLARIZING PLATE ASSEMBLY

(71) Applicant: Sumitomo Chemical Company, Limited, Tokyo (JP)

(72) Inventors: Kenji Matsuno, Niihama (JP); Yuuhei Inokuchi, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 167 days.

(21) Appl. No.: 15/493,649

(22) Filed: Apr. 21, 2017

(65) Prior Publication Data
US 2017/0282506 A1 Oct. 5, 2017

Related U.S. Application Data

(63) Continuation of application No. 15/032,852, filed as application No. PCT/JP2014/078036 on Oct. 22, 2014, now abandoned.

(30) Foreign Application Priority Data

Oct. 29, 2013 (JP) .................................. 2013-224018
Jul. 17, 2014 (JP) .................................. 2014-146785

(51) Int. Cl.
*B32B 27/06* (2006.01)
*G02B 5/30* (2006.01)
(Continued)

(52) U.S. Cl.
CPC ................ *B32B 27/06* (2013.01); *B32B 7/12* (2013.01); *B32B 27/306* (2013.01); *G02B 1/14* (2015.01);
(Continued)

(58) Field of Classification Search
None
See application file for complete search history.

(56) References Cited

U.S. PATENT DOCUMENTS 8,758,869 B2 * 6/2014 Kim .................... G02B 27/2214
349/122
2003/0137732 A1 7/2003 Sugino et al.
(Continued)

FOREIGN PATENT DOCUMENTS

CN 102533135 A 7/2012
JP H01240517 A 9/1989
(Continued)

OTHER PUBLICATIONS

Office Action dated Jun. 12, 2017 in KR Application No. 10-2016-7013427.
(Continued)

*Primary Examiner* — Derek S. Chapel
(74) *Attorney, Agent, or Firm* — Panitch Schwarze Belisario & Nadel LLP

(57) ABSTRACT

There is provided a polarizing plate, including: a polarizing layer having a thickness not greater than 20 μm; a first protective film stacked on one surface of the polarizing layer, with a first adhesive layer formed from an active energy ray curing adhesive being interposed; and a second protective film stacked on the other surface of the polarizing layer, with a second adhesive layer formed from a water-soluble adhesive being interposed. There are also provided a polarizing plate with a pressure sensitive adhesive layer, a substrate having a polarizing plate bonded thereto, a liquid crystal display device, and an organic electroluminescence display device, all of which include the polarizing plate.
(Continued)

Preferably, at least one of the first protective film and the second protective film has a moisture permeability not higher than 1000 g/m²/24 hr.

20 Claims, 7 Drawing Sheets

(51) Int. Cl.
*B32B 7/12* (2006.01)
*B32B 27/30* (2006.01)
*G02B 1/14* (2015.01)
*G02F 1/1335* (2006.01)

(52) U.S. Cl.
CPC .... *G02B 5/3033* (2013.01); *B32B 2307/4026* (2013.01); *B32B 2307/412* (2013.01); *B32B 2307/42* (2013.01); *B32B 2457/202* (2013.01); *B32B 2457/206* (2013.01); *G02F 1/133528* (2013.01)

(56) References Cited

U.S. PATENT DOCUMENTS

| | | |
|---|---|---|
| 2004/0095309 A1 | 5/2004 | Vincent et al. |
| 2007/0092662 A1 | 4/2007 | Matsuno et al. |
| 2008/0074376 A1 | 3/2008 | Kim et al. |
| 2009/0251644 A1 | 10/2009 | Park et al. |
| 2011/0043733 A1 | 2/2011 | Suzuki et al. |
| 2011/0315306 A1 | 12/2011 | Goto et al. |
| 2012/0249932 A1 | 10/2012 | Park et al. |
| 2012/0327512 A1 | 12/2012 | Goto et al. |
| 2014/0285887 A1 | 9/2014 | Goto et al. |

FOREIGN PATENT DOCUMENTS

| | | |
|---|---|---|
| JP | H0314882 A | 1/1991 |
| JP | H03122137 A | 5/1991 |
| JP | 2001343521 A | 12/2001 |
| JP | 2003098345 A | 4/2003 |
| JP | 2008165163 A | 7/2008 |
| JP | 2009157352 A | 7/2009 |
| JP | 2012048181 A | 3/2012 |
| JP | 2012133301 A | 7/2012 |
| JP | 2012140610 A | 7/2012 |
| JP | 2012155165 A | 8/2012 |
| JP | 2012208250 A | 10/2012 |
| JP | 2012230387 A | 11/2012 |
| JP | 2013210513 A | 10/2013 |
| JP | 2014232126 A | 12/2014 |
| KR | 2007-0086056 A | 8/2007 |
| KR | 20110061722 A | 6/2011 |
| KR | 20110118825 A | 11/2011 |
| KR | 20110131512 A | 12/2011 |
| TW | 200417287 A | 9/2004 |
| TW | 201207495 A | 2/2012 |
| TW | 201302465 A | 1/2013 |
| WO | 2006/064967 A1 | 6/2006 |

OTHER PUBLICATIONS

Office Action dated Dec. 8, 2015 in JP Application No. 2015543199.

International Search Report dated Dec. 2, 2014 in International Application No. PCT/JP2014/078036.

Decision to Grant dated May 10, 2016 in JP Application No. 2015543199.

Allowed Claims issued May 10, 2016 in JP Application No. 2015-543199.

Examination Report dated Aug. 15, 2016 in TW Application No. 103137145.

Office Action dated Sep. 29, 2016 in CN Application No. 201480059172.4.

Office Action dated Aug. 30, 2016 in JP Application No. 2016-114194.

Office Action dated Nov. 7, 2016 in KR Application No. 10-2016-7013427.

Office Action dated Mar. 30, 2017 in KR Application No. 10-2016-7013427.

Office Action dated Sep. 2, 2016 in U.S. Appl. No. 15/032,852 by Matsuno.

Office Action dated Dec. 23, 2016 in U.S. Appl. No. 15/032,852 by Matsuno.

Office Action dated May 3, 2018 in CN Application No. 201710851866.7.

Advisory Action dated Apr. 13, 2017 in U.S. Appl. No. 15/032,852, by Matsuno.

Office Action dated Aug. 24, 2018 in KR Application No. 10-2018-7008835.

* cited by examiner

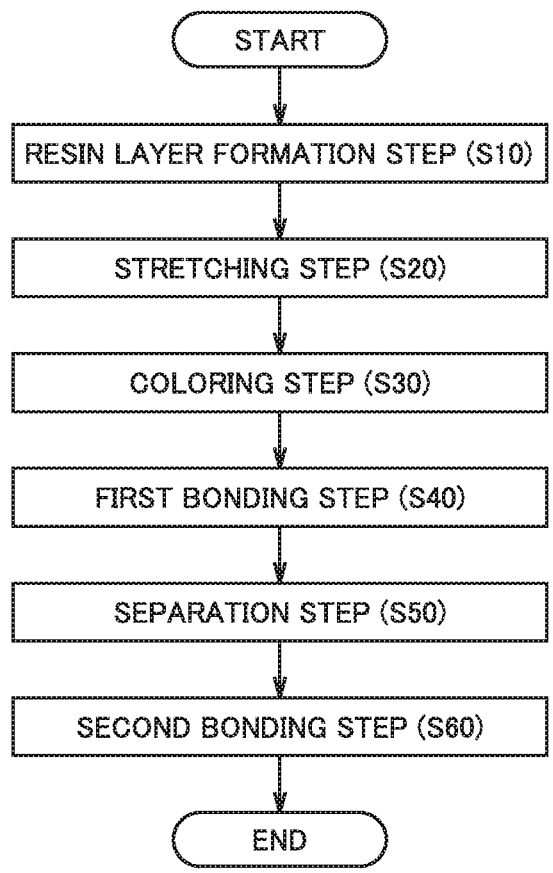

METHOD OF MANUFACTURING A POLARIZING PLATE ASSEMBLY

CROSS REFERENCE TO RELATED APPLICATION

This application is a Continuation of U.S. patent application Ser. No. 15/032,852, filed Apr. 28, 2016, which was a Section 371 of International Application No. PCT/JP2014/078036, filed Oct. 22, 2014, which was published in the Japanese language on May 7, 2015, under International Publication No. WO 2015/064433 A1, and the disclosure of which is incorporated herein by reference.

TECHNICAL FIELD

The present invention relates to a polarizing plate having protective films bonded to opposing surfaces of a polarizing layer.

BACKGROUND ART

A polarizing plate has been widely used as a polarization supply element or a polarization detection element in a display device such as a liquid crystal display device. Generally, the polarizing plate has such a configuration that a protective film/protective films is/are bonded to one surface or both surfaces of a polarizer by using an adhesive.

The use of a water-soluble adhesive as the adhesive for bonding the polarizer and the protective film has been conventionally known. The use of an active energy ray curing adhesive has also been conventionally known. For example, Japanese Patent Laying-Open No. 2012-208250 (PTD 1) discloses a polarizing plate obtained by bonding a protective film to a polarizer with an adhesive layer formed of an active energy ray curing adhesive being interposed, and thereafter, curing the adhesive layer. When the water-soluble adhesive is used, high moisture permeability is required in the protective film. On the other hand, when the active energy ray curing adhesive is used, the moisture permeability of the protective film is not restricted, and thus, the active energy ray curing adhesive is advantageous in this respect. In addition, the active energy ray curing adhesive is also advantageous in that the adhesive layer does not need to be dried and the drying step which requires relatively long time can be omitted. Actually, in Examples of PTD 1, the protective films on opposing surfaces of the polarizer are both bonded by using the active energy ray curing adhesive.

CITATION LIST

Patent Document

PTD 1: Japanese Patent Laying-Open No. 2012-208250

SUMMARY OF INVENTION

Technical Problem

Currently, a thickness of a polarizer constituting a polarizing plate is generally approximately 30 μm. However, in accordance with requests from the market for reducing a thickness of a polarizing plate, further reduction in thickness of a polarizer is demanded. However, as a result of study by the inventors of the present invention, it became clear that a polarizing plate obtained by reducing a thickness of a polarizer to approximately 20 μm or smaller, bonding protective films to opposing surfaces of the polarizer by using an active energy ray curing adhesive, and curing the adhesive layers may cause a problem of poor appearance, i.e., occurrence of minor irregularities over the entire surface of the polarizing plate. This problem was not caused in the case of using a thick polarizer of approximately 30 μm.

These minor irregularities can also be visually recognized when the polarizing plate is bonded to a flat surface such as a substrate (e.g., a glass substrate constituting a liquid crystal cell), and thus, these minor irregularities degrade the appearance of the polarizing plate.

Thus, an object of the present invention is to provide a polarizing plate with good appearance in which the occurrence of the aforementioned minor irregularities is suppressed, the polarizing plate having protective films stacked on opposing surfaces of a thin polarizer of not greater than 20 μm in thickness, with adhesive layers being interposed.

Solution to Problem

The present invention provides a polarizing plate, a polarizing plate with a pressure sensitive adhesive layer, a substrate having a polarizing plate bonded thereto, a liquid crystal display device, and an organic electroluminescence display device described below.

[1] A polarizing plate, including:
a polarizing layer having a thickness not greater than 20 μm;
a first protective film stacked on one surface of the polarizing layer, with a first adhesive layer formed from an active energy ray curing adhesive being interposed; and
a second protective film stacked on the other surface of the polarizing layer, with a second adhesive layer formed from a water-soluble adhesive being interposed.

[2] The polarizing plate according to [1], wherein at least one of the first protective film and the second protective film has a moisture permeability not higher than 1000 g/m²/24 hr.

[3] The polarizing plate according to [1] or [2], wherein the second protective film has a moisture permeability of 10 to 1000 g/m²/24 hr.

[4] The polarizing plate according to any one of [1] to [3], wherein the polarizing layer is a stretched polyvinyl alcohol-based resin layer containing a dichroic colorant.

[5] The polarizing plate according to any one of [1] to [4], wherein the polarizing layer has a thickness not greater than 10 μm.

[6] The polarizing plate according to any one of [1] to [5], wherein the polarizing plate has a rectangular shape having a diagonal length of 3 to 32 cm.

[7] The polarizing plate according to any one of [1] to [6], further including a surface treatment layer stacked on a surface of the first protective film or the second protective film, the surface being a surface on an opposite side of the polarizing layer.

[8] The polarizing plate according to [7], wherein the surface treatment layer is a hard coat layer, an antireflective layer or an electroconductive layer.

[9] The polarizing plate according to any one of [1] to [8], wherein the first protective film or the second protective film has a thickness not greater than 50 μm.

[10] The polarizing plate according to any one of [1] to [9], wherein a tensile elastic modulus at 80° C. of the first protective film or the second protective film is not lower than 1500 MPa.

[11] A polarizing plate with a pressure sensitive adhesive layer, including:
the polarizing plate as recited in any one of [1] to [10]; and a transparent pressure sensitive adhesive layer provided on the first protective film side of the polarizing plate.

[12] A substrate having a polarizing plate bonded thereto, including:
the polarizing plate as recited in any one of [1] to [10]; and
a substrate, wherein
the polarizing plate is bonded to a surface of the substrate on the first protective film side of the polarizing plate, with a transparent pressure sensitive adhesive layer being interposed.

[13] A liquid crystal display device, including:
the polarizing plate as recited in any one of [1] to [10]; and
a liquid crystal cell including a substrate, wherein
the polarizing plate is bonded to a surface of the substrate on the first protective film side of the polarizing plate, and
a resolution of a display screen is not lower than 300 dpi.

[14] The liquid crystal display device according to [13], wherein the liquid crystal cell is a normally black-type liquid crystal cell.

[15] An organic electroluminescence display device, including:
the polarizing plate as recited in any one of [1] to [10]; and
an organic electroluminescence display element including a substrate, wherein
the polarizing plate is bonded to a surface of the substrate on the first protective film side of the polarizing plate, and
the first protective film has an in-plane phase retardation value of 100 to 180 nm, and an angle of a slow axis of the first protective film with respect to an absorption axis of the polarizing layer is substantially 45° or substantially 135°.

Advantageous Effects of Invention

According to the present invention, there can be provided a polarizing plate with good appearance in which the occurrence of the aforementioned minor irregularities is suppressed, the polarizing plate having protective films stacked on opposing surfaces of a thin polarizer of not greater than 20 μm in thickness, with adhesive layers being interposed.

BRIEF DESCRIPTION OF DRAWINGS

FIG. 2 is a flowchart showing one preferable example of a method of manufacturing the polarizing plate.

DESCRIPTION OF EMBODIMENTS

A polarizing plate according to the present invention will hereinafter be described in detail with reference to embodiments.

<Polarizing Plate>

Figure 1A:
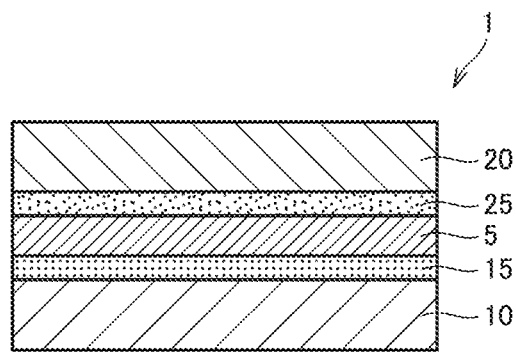
FIG. 1A is a schematic cross-sectional view showing one example of a layer configuration of a polarizing plate according to the present invention.

FIG. 1A is a schematic cross-sectional view showing one example of a layer configuration of a polarizing plate according to the present invention. As shown in FIG. 1A, a polarizing plate 1 of the present invention has such a configuration that protective films are stacked on opposing surfaces of a polarizing layer 5 with adhesive layers being interposed. Specifically, polarizing plate 1 of the present invention includes: thin polarizing layer 5 having a thickness not greater than 20 μm; a first protective film 10 stacked on one surface of polarizing layer 5, with a first adhesive layer 15 formed from an active energy ray curing adhesive being interposed; and a second protective film 20 stacked on the other surface of polarizing layer 5, with a second adhesive layer 25 formed from a water-soluble adhesive being interposed.

According to such a configuration, it is possible to effectively suppress or prevent the poor appearance caused by the minor irregularities that occur on the surfaces of the protective films in the polarizing plate obtained by reducing a thickness of the polarizing layer to 20 μm or smaller, bonding the protective films to the opposing surfaces of the polarizing layer by using the active energy ray curing adhesive, and curing the adhesive layers. In particular, it is possible to more effectively suppress or prevent the occurrence of the minor irregularities on an outer surface (surface on the opposite side of polarizing layer 5) of second protective film 20.

It is not clear why the minor irregularities on the surfaces of the protective films can be suppressed or prevented in the polarizing plate of the present invention although the thickness of polarizing layer 5 is not greater than 20 μm. However, the active energy ray curing adhesive shrinks relatively greatly when hardened, and thus, it is conceivable that by stacking second protective film 20 using the water-soluble adhesive, the influence of shrinkage of the active energy ray curing adhesive is mitigated and the minor irregularities on the surfaces are suppressed.

Figure 1B:
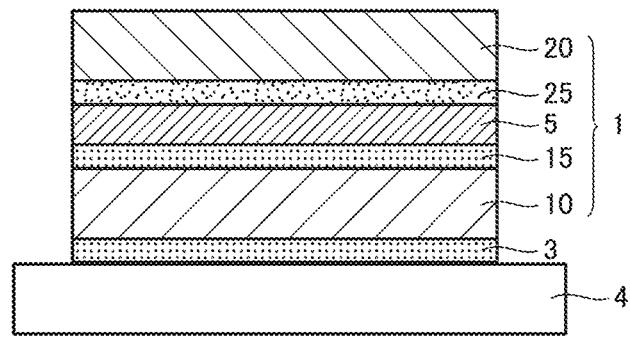
FIG. 1B is a schematic cross-sectional view showing one example of a layer configuration of a polarizing plate with a pressure sensitive adhesive layer and a substrate having a polarizing plate bonded thereto according to the present invention.

FIG. 1B is a schematic cross-sectional view showing one example of a substrate having a polarizing plate bonded thereto, which has polarizing plate 1 shown in FIG. 1A bonded to a substrate 4. In this example, polarizing plate 1 is provided with a transparent pressure sensitive adhesive layer 3 on the first protective film 10 side thereof and forms a polarizing plate with a pressure sensitive adhesive layer. A glass substrate made of glass is used as substrate 4. Polarizing plate 1 is bonded to substrate 4 on the first protective film 10 side, with transparent pressure sensitive adhesive layer 3 being interposed. Substrate 4 may be a glass substrate made of glass, or a resin substrate made of resin, and a surface of substrate 4 on the side where substrate 4 and polarizing plate 1 are bonded is preferably formed of a flat surface.

Components constituting polarizing plate 1 will be described hereinafter.

(1) Polarizing Layer

Polarizing layer 5 can be a uniaxially stretched polyvinyl alcohol-based resin layer having a dichroic colorant adsorbed and oriented therein. In the present invention, a thickness of polarizing layer 5 is not greater than 20 µm, preferably not greater than 15 µm, more preferably not greater than 11 µm, further preferably not greater than 10 µm, and particularly preferably not greater than 7 µm. From the perspectives of easiness to handle as well as easiness to achieve a degree of polarization of not lower than 95% which is suitable for use in display device applications and particularly a degree of polarization of not lower than 99.9% which is suitable for use in liquid crystal display device applications, the thickness of polarizing layer 5 is normally not smaller than 2 µm. Since the thickness of polarizing layer 5 is set to be not greater than 20 µm, a thickness of polarizing plate 1 can be reduced. On the other hand, according to the present invention, even when such thin polarizing layer 5 is used, the protective films can be bonded to the opposing surfaces of polarizing layer 5 without the occurrence of poor appearance (irregularities on the surface of polarizing plate 1).

As a polyvinyl alcohol-based resin forming the polyvinyl alcohol-based resin layer, a saponified polyvinyl acetate-based resin can be used. As the polyvinyl acetate-based resin, a copolymer of vinyl acetate and another monomer copolymerizable therewith is indicated as an example, in addition to polyvinyl acetate which is a homopolymer of vinyl acetate. Examples of another monomer copolymerizable with vinyl acetate include unsaturated carboxylic acids, olefins, vinyl ethers, unsaturated sulfonic acids, acrylamides having an ammonium group, and the like.

A degree of saponification of the polyvinyl alcohol-based resin can be within a range of 80.0 to 100.0 mol %, preferably within a range of 90.0 to 99.5 mol %, and more preferably within a range of 94.0 to 99.0 mol %. If the degree of saponification is lower than 80.0 mol %, the water resistance and the moisture and heat resistance of obtained polarizing plate 1 decrease. When a polyvinyl alcohol-based resin having a degree of saponification exceeding 99.5 mol % is used, the coloring speed may decrease and the productivity may decrease, and in addition, polarizing layer 5 having sufficient polarization characteristics is not obtained in some cases.

The degree of saponification refers to a rate in unit ratio (mol %) at which acetic acid groups (acetoxy groups: $-OCOCH_3$) included in the polyvinyl acetate-based resin which is a raw material of the polyvinyl alcohol-based resin have changed into hydroxyl groups by a saponification step. The degree of saponification is defined by the following equation:

$$\text{degree of saponification (mol \%)} = 100 \times (\text{the number of hydroxyl groups})/(\text{the number of hydroxyl groups} + \text{the number of acetic acid groups}).$$

The degree of saponification can be determined in accordance with JIS K 6726 (1994). Higher degree of saponification indicates higher rate of the hydroxyl groups, and thus, lower rate of acetic acid groups that inhibit crystallization.

The polyvinyl alcohol-based resin may be a modified polyvinyl alcohol which has been partially modified. Examples of the modified polyvinyl alcohol include a substance obtained by modifying the polyvinyl alcohol-based resin with olefin such as ethylene and propylene; unsaturated carboxylic acid such as acrylic acid, methacrylic acid and crotonic acid; alkyl ester of unsaturated carboxylic acid; acrylamide; or the like. A rate of modification is preferably lower than 30 mol %, and more preferably lower than 10% mol. If modification is performed at a rate exceeding 30 mol %, adsorption of the dichroic colorant becomes less likely and polarizing layer 5 having sufficient polarization characteristics is not obtained.

An average degree of polymerization of the polyvinyl alcohol-based resin is preferably 100 to 10000, more preferably 1500 to 8000, and further preferably 2000 to 5000. The average degree of polymerization of the polyvinyl alcohol-based resin can also be determined in accordance with JIS K 6726 (1994). If the average degree of polymerization is lower than 100, it is difficult to obtain preferable polarization characteristics. If the average degree of polymerization exceeds 10000, the solubility in a solvent becomes worse and formation of the polyvinyl alcohol-based resin layer becomes difficult.

Examples of commercially available products of the polyvinyl alcohol-based resin suitably used in the present invention include: "PVA124" (a degree of saponification: 98.0 to 99.0 mol %), "PVA117" (a degree of saponification: 98.0 to 99.0 mol %), "PVA624" (a degree of saponification: 95.0 to 96.0 mol %), and "PVA617" (a degree of saponification: 94.5 to 95.5 mol %) manufactured by Kuraray Co., Ltd.; "AH-26" (a degree of saponification: 97.0 to 98.8 mol %), "AH-22" (a degree of saponification: 97.5 to 98.5 mol %), "NH-18" (a degree of saponification: 98.0 to 99.0 mol %), and "N-300" (a degree of saponification: 98.0 to 99.0 mol %) manufactured by The Nippon Synthetic Chemical Industry Co., Ltd.; and "JC-33" (a degree of saponification: not lower than 99.0 mol %), "JM-33" (a degree of saponification: 93.5 to 95.5 mol %), "JM-26" (a degree of saponification: 95.5 to 97.5 mol %), "JP-45" (a degree of saponification: 86.5 to 89.5 mol %), "JF-17" (a degree of saponification: 98.0 to 99.0 mol %), "JF-17L" (a degree of saponification: 98.0 to 99.0 mol %), and "JF-20" (a degree of saponification: 98.0 to 99.0 mol %) manufactured by Japan Vam & Poval Co., Ltd., all of which are trade names.

The dichroic colorant contained (adsorbed and oriented) in polarizing layer 5 can be iodine or dichroic organic dye. Specific examples of the dichroic organic dye include red BR, red LR, red R, pink LB, rubine BL, Bordeaux GS, sky blue LG, lemon yellow, blue BR, blue 2R, navy RY, green LG, violet LB, violet B, black H, black B, black GSP, yellow 3G, yellow R, orange LR, orange 3R, scarlet GL, scarlet KGL, congo red, brilliant violet BK, supra blue G, supra blue GL, supra orange GL, direct sky blue, direct fast orange S, and fast black. Only one type of dichroic colorant may be used alone, or two or more types of dichroic colorants may be used together.

(2) First and Second Protective Films

Each of first protective film 10 and second protective film 20 can be a transparent resin film composed of a thermoplastic resin, e.g., a polyolefin-based resin such as a chain-like polyolefin-based resin (a polypropylene-based resin and the like) and a cyclic polyolefin-based resin (a norbornene-based resin and the like); a cellulose ester-based resin such as cellulose triacetate and cellulose diacetate; a polyester-based resin such as polyethylene terephthalate, polyethylene naphthalate and polybutylene terephthalate; a polycarbonate-based resin; a (meth)acryl-based resin; or a mixture thereof, a copolymer thereof, or the like. In addition, first protective film 10 and second protective film 20 may be glass films. Only first protective film 10 may be a glass film and second protective film 20 may be a transparent resin film. Alternatively, only second protective film 20 may be a glass film and first protective film 10 may be a transparent resin film. Alternatively, both first protective film 10 and second protective film 20 may be glass films.

The cyclic polyolefin-based resin is a generic designation of resins polymerized by using cyclic olefin as a polymerization unit, and examples of the cyclic polyolefin-based resin include resins described in Japanese Patent Laying-Open No. 1-240517, Japanese Patent Laying-Open No. 3-14882, Japanese Patent Laying-Open No. 3-122137 and the like. Specific examples of the cyclic polyolefin-based resin include a ring-opening (co)polymer of cyclic olefin, an addition polymer of cyclic olefin, a copolymer of cyclic olefin and chainlike olefin such as ethylene and propylene (representatively a random copolymer), a graft polymer obtained by modifying the former with unsaturated carboxylic acid or a derivative thereof, a hydride thereof, and the like. Among these, a norbornene-based resin using a norbornene-based monomer such as norbornene or a polycyclic norbornene-based monomer is preferably used as cyclic olefin.

Various products of the cyclic polyolefin-based resin are commercially available. Examples of commercially available products of the cyclic polyolefin-based resin include "Topas" (manufactured by Topas Advanced Polymers GmbH and available from Polyplastics Co., Ltd.), "ARTON" (manufactured by JSR Corporation), "ZEONOR" (manufactured by ZEON Corporation), "ZEONEX" (manufactured by ZEON Corporation), and "APEL" (manufactured by Mitsui Chemicals, Inc.), all of which are trade names.

Commercially available products of a cyclic polyolefin-based resin film such as "Escena" (manufactured by Sekisui Chemical Co., Ltd.), "SCA40" (manufactured by Sekisui Chemical Co., Ltd.) and "ZEONOR film" (manufactured by ZEON Corporation), all of which are trade names, may also be used as the protective film.

The cellulose ester-based resin is an ester of cellulose and fatty acid. Specific examples of the cellulose ester-based resin include cellulose triacetate, cellulose diacetate, cellulose tripropionate, and cellulose dipropionate. In addition, a copolymer thereof, and a substance obtained by modifying some hydroxyl groups with other type of substituent can also be used. Among these, cellulose triacetate (triacetylcellulose: TAC) is particularly preferable. Many cellulose triacetate products are commercially available, and are advantageous also in terms of availability and cost. Examples of commercially available products of cellulose triacetate include "FUJITAC TD80" (manufactured by Fujifilm Corporation), "FUJITAC TD80UF" (manufactured by Fujifilm Corporation), "FUJITAC TD80UZ" (manufactured by Fujifilm Corporation), "FUJITAC TD40UZ" (manufactured by Fujifilm Corporation), "KC8UX2M" (manufactured by Konica Minolta Optics, Inc.), and "KC4UY" (manufactured by Konica Minolta Optics, Inc.), all of which are trade names.

First protective film 10 or second protective film 20 can also be a protective film further having an optical function such as a phase retardation film and a luminance enhancement film. For example, by stretching (uniaxially stretching, biaxially stretching or the like) the transparent resin film composed of the aforementioned material or by forming a liquid crystal layer or the like on this film, a phase retardation film having an arbitrary phase retardation value can be obtained. Only first protective film 10 may further have the optical function, or only second protective film 20 may further have the optical function, or both first protective film 10 and second protective film 20 may further have the optical function.

A surface treatment layer (coating layer) such as a hard coat layer, an antiglare layer, an antireflective layer, an antistatic layer, an antifouling layer, and an electroconductive layer can also be formed on a surface of first protective film 10 or second protective film 20, wherein the surface is a surface on the opposite side of polarizing layer 5. A method of forming the surface treatment layer on the surface of the protective film is not particularly limited, and a known method can be used. This surface treatment layer may be formed on first protective film 10 and second protective film 20, or may be formed only on first protective film 10. However, this surface treatment layer is preferably formed on second protective film 20, and in this case, the surface of first protective film 10 may be a non-treated surface that does not have the surface treatment layer.

In the case where the hard coat layer or the antireflective layer is provided on the surface, on the opposite side of polarizing layer 5, of first protective film 10 or second protective film 20, the poor appearance caused by the minor irregularities present on the surface of the protective film is easily noticeable when the polarizing plate is viewed from the hard coat layer side or the antireflective layer side. Therefore, the present invention is preferably applied in the above-mentioned case.

In addition, in the case where the electroconductive layer is provided on the surface, on the opposite side of polarizing layer 5, of first protective film 10 and/or second protective film 20 and a surface of the electroconductive layer is bonded to a cover glass or a touch panel with an optically transparent resin layer being interposed, the poor appearance caused by the minor irregularities present on the surface of the protective film tends to be easily noticeable when the polarizing plate is viewed from the cover glass side or the touch panel side, because an optical reflectivity of many electroconductive layers is relatively high due to a refractive index thereof. Therefore, the present invention is particularly preferably applied in the above-mentioned case. Examples of the electroconductive layer include a layer formed of ATO (antimony tin oxide), ITO (indium tin oxide) or the like, and others.

First protective film 10 and second protective film 20 may be protective films of the same type, or may be protective films of different types. Examples of the protective films of different types include, for example, a combination of protective films different at least in type of the thermoplastic resin constituting the protective film, a combination of protective films different at least in presence or absence of the optical function of the protective film or type thereof, and a combination of protective films different at least in presence or absence of the surface treatment layer formed on the surface or type thereof.

From the perspective of reducing the thickness of polarizing plate 1, it is preferable that a thickness of each of first and second protective films 10 and 20 is small. However, when the thickness is too small, the strength decreases and the workability deteriorates. Therefore, the thickness of each of first and second protective films 10 and 20 is preferably 5 to 90 μm, more preferably 5 to 60 μm, and further preferably 5 to 50 μm.

When first protective film 10 or second protective film 20 has a thickness not greater than 50 μm, the minor irregularities tend to easily occur on the surface thereof. Therefore, the present invention is preferably applied in the above-mentioned case.

As described above, polarizing layer 5 used in polarizing plate 1 of the present invention is thin, and thus, decoloration of the dichroic colorant tends to easily occur under the high-temperature and high-humidity environment. Therefore, a lower moisture permeability is more preferable in first and second protective films 10 and 20. Specifically, the moisture permeability of each of first and second protective films 10 and 20 is preferably not higher than 1000 $g/m^2/24$ hr, and more preferably not higher than 150 $g/m^2/24$ hr.

On the other hand, the water-soluble adhesive is used to bond second protective film 20 with second adhesive layer 25 interposed. Therefore, if the moisture permeability of second protective film 20 is too low, drying of the adhesive layer requires time, which may lead to low productivity. Thus, from the perspective of productivity of polarizing plate 1, the moisture permeability of second protective film 20 is preferably 10 to 1000 $g/m^2/24$ hr, and more preferably 10 to 150 $g/m^2/24$ hr.

A higher tensile elastic modulus is more preferable in first protective film 10 and/or second protective film 20 used in the present invention. It is preferable that a tensile elastic modulus at 80° C. is not lower than 1500 MPa, and preferably not lower than 2000 MPa, and is normally not higher than 10000 MPa. By applying the protective film having a high tensile elastic modulus, the poor appearance can be effectively suppressed or prevented.

(3) First Adhesive Layer

The adhesive forming first adhesive layer 15 is an active energy ray curing adhesive that can be hardened by irradiation with an active energy ray such as an ultraviolet ray, visible light, an electron beam, and an X ray, and first adhesive layer 15 is a hardened product layer of the adhesive. Among these, an active energy ray curing adhesive including, as a curing component, an epoxy-based compound hardened by cationic polymerization can be more preferably used, and an ultraviolet curing adhesive including the epoxy-based compound as the curing component can be further preferably used as the adhesive forming first adhesive layer 15. The epoxy-based compound herein refers to a compound having one or more epoxy groups, and preferably two or more epoxy groups, on average in a molecule. Only one type of epoxy-based compound may be used alone, or two or more types of epoxy-based compounds may be used together.

Examples of the epoxy-based compound that can be suitably used include: a hydrogenated epoxy-based compound (glycidyl ether of polyol having an alicyclic ring) obtained by reacting epichlorohydrin with alicyclic polyol obtained by the hydrogenation reaction of an aromatic ring of aromatic polyol; an aliphatic epoxy-based compound such as polyglycidyl ether of aliphatic polyalcohol or alkylene oxide adduct thereof; and an alicyclic epoxy-based compound which is an epoxy-based compound having, in a molecule, one or more epoxy groups coupled to an alicyclic ring.

The active energy ray curing adhesive can also further contain a radically polymerizable (meth)acryl-based compound as a curing component. Examples of the (meth)acryl-based compound can include a (meth)acryloyloxy group-containing compound such as a (meth)acrylate monomer having at least one (meth)acryloyloxy group in a molecule, and a (meth)acrylate oligomer obtained by reacting two or more types of functional group-containing compounds and having at least two (meth)acryloyloxy groups in a molecule.

When the active energy ray curing adhesive includes, as a curing component, the epoxy-based compound hardened by cationic polymerization, the active energy ray curing adhesive preferably contains a photocationic polymerization initiator. Examples of the photocationic polymerization initiator can include: an aromatic diazonium salt; an onium salt such as an aromatic iodonium salt and an aromatic sulfonium salt; an iron-allene complex; and the like. When the active energy ray curing adhesive contains the radically polymerizable curing component such as the (meth)acryl-based compound, the active energy ray curing adhesive preferably contains a photoradical polymerization initiator. Examples of the photoradical polymerization initiator can include an acetophenone-based initiator, a benzophenone-based initiator, a benzoin ether-based initiator, a thioxanthone-based initiator, xanthone, fluorenone, camphorquinone, benzaldehyde, anthraquinone and the like.

As needed, the active energy ray curing adhesive can contain an additive such as a cationic polymerization accelerator including oxetanes and polyols, a photosensitizer, an ion trap agent, an antioxidant, a chain transfer agent, a tackiness imparting agent, a thermoplastic resin, a filler, a fluidity controlling agent, a plasticizer, a defoamant, an antistatic agent, a leveling agent, and a solvent.

A thickness of first adhesive layer 15 is, for example, approximately 0.01 to 10 μm, preferably approximately 0.01 to 5 μm, and more preferably not greater than 2 μm (e.g., not greater than 1 μm), and preferably not smaller than 0.4 First adhesive layer 15 having a thickness not smaller than 0.4 μm is advantageous in that first adhesive layer 15 is relatively easily formed without entry of bubbles. On the other hand, the minor irregularities become more likely to occur on the surface of the protective film as the thickness becomes greater. Therefore, when the thickness of first adhesive layer 15 is not smaller than 0.4 μm, the present invention is particularly preferably applied.

In addition, first adhesive layer 15 is formed of the active energy ray curing adhesive and shrinks when the adhesive is hardened. Therefore, polarizing plate 1 is likely to have a concave shape when polarizing plate 1 is placed on a flat surface with first protective film 10 of polarizing plate 1 facing upward. Therefore, in order to suppress such curl, the thickness of first adhesive layer 15 is preferably set to be not greater than 2 μm (e.g., not greater than 1 μm).

(4) Second Adhesive Layer

The water-soluble adhesive forming second adhesive layer 25 is obtained by dissolving an adhesive component in water or by dispersing an adhesive component in water. The preferably used water-soluble adhesive is, for example, an adhesive composition including a polyvinyl alcohol-based resin or a urethane resin as a main component. A thickness of second adhesive layer 25 formed from the water-soluble adhesive is normally not greater than 1 μm, and normally not smaller than 0.01 μm.

When the polyvinyl alcohol-based resin is used as the main component of the adhesive, the polyvinyl alcohol-based resin may be a modified polyvinyl alcohol-based resin such as carboxyl group-modified polyvinyl alcohol, acetoacetyl group-modified polyvinyl alcohol, methylol group-modified polyvinyl alcohol, and amino group-modified polyvinyl alcohol, or may be partially saponified polyvinyl alcohol or completely saponified polyvinyl alcohol. The polyvinyl alcohol-based resin may be a polyvinyl alcohol-based copolymer obtained by saponifying a copolymer of vinyl acetate and another monomer copolymerizable therewith, or may be a vinyl alcohol homopolymer obtained by saponifying polyvinyl acetate which is a homopolymer of vinyl acetate.

The water-soluble adhesive including the polyvinyl alcohol-based resin as the adhesive component is normally an aqueous solution of the polyvinyl alcohol-based resin. A concentration of the polyvinyl alcohol-based resin in the adhesive is normally 1 to 10 parts by weight, and preferably 1 to 5 parts by weight, with respect to 100 parts by weight of water.

In order to enhance adhesion, a cross-linker or a curing component such as polyaldehyde, a melamine-based compound, a zirconia compound, a zinc compound, glyoxal, and a water-soluble epoxy resin is preferably added to the adhesive formed of the aqueous solution of the polyvinyl alcohol-based resin. As the water-soluble epoxy resin, a polyamide polyamine epoxy resin obtained by reacting epichlorohydrin with polyamideamine obtained by reaction of polyalkylene polyamine such as diethylene triamine and triethylenetetramine with dicarboxylic acid such as adipic acid can, for example, be suitably used. Examples of commercially available products of the polyamide polyamine epoxy resin include "Sumirez Resin 650" (manufactured by Taoka Chemical Company, Ltd.), "Sumirez Resin 675" (manufactured by Taoka Chemical Company, Ltd.), "WS-525" (manufactured by Japan PMC Corporation) and the like. An amount of addition of these curing component or cross-linker (when both the curing component and the cross-linker are added, a total amount thereof) is normally 1 to 100 parts by weight, and preferably 1 to 50 parts by weight, with respect to 100 parts by weight of the polyvinyl alcohol-based resin. If the aforementioned amount of addition of the curing component or cross-linker is smaller than 1 part by weight with respect to 100 parts by weight of the polyvinyl alcohol-based resin, the effect of enhancing adhesion tends to become small. If the aforementioned amount of addition of the curing component or cross-linker exceeds 100 parts by weight with respect to 100 parts by weight of the polyvinyl alcohol-based resin, the adhesive layer tends to become brittle.

When the urethane resin is used as the main component of the adhesive, examples of the appropriate adhesive composition can include a mixture of a polyester-based ionomer-type urethane resin and a compound having a glycidyloxy group. The polyester-based ionomer-type urethane resin refers to a urethane resin having a polyester main chain, into which a small amount of an ionic component (hydrophilic component) is introduced. This ionomer-type urethane resin is suitable as the water-soluble adhesive because the ionomer-type urethane resin is directly emulsified in water and becomes emulsion without using an emulsifier.

<Method of Manufacturing Polarizing Plate>

Polarizing plate 1 of the present invention shown in FIG. 1A can be manufactured by, for example, the following methods:

[a] a method of fabricating, as a single-layer film, a polyvinyl alcohol-based resin film (hereinafter also referred to as "polarizing film") having polarization characteristics as polarizing layer 5 from a polyvinyl alcohol-based resin film, and bonding first and second protective films 10 and 20 to this polarizing film; and

[b] a method of applying a coating liquid containing a polyvinyl alcohol-based resin to at least one surface of a substrate film to form a polyvinyl alcohol-based resin layer, and thereafter, providing prescribed treatment for the obtained laminated film to obtain polarizing layer 5 from the polyvinyl alcohol-based resin layer, and bonding one of first and second protective films 10 and 20 to the obtained polarizing laminated film, and thereafter, separating the substrate film, and then, bonding the other protective film.

[Manufacturing Method [a]]

The polarizing film as polarizing layer 5 used in the manufacturing method [a] can be fabricated by using, as a starting material, the polyvinyl alcohol-based resin film made by forming a film of the aforementioned polyvinyl alcohol-based resin. A method of forming a film of the polyvinyl alcohol-based resin is not particularly limited, and a known method such as a melt extrusion method and a solvent casting method can be used. A thickness of the polyvinyl alcohol-based resin film is, for example, approximately 10 to 150 μm.

The polarizing film can be manufactured through a step of uniaxially stretching the polyvinyl alcohol-based resin film, a step of coloring the polyvinyl alcohol-based resin film with a dichroic colorant to adsorb the dichroic colorant, a step of treating the polyvinyl alcohol-based resin film having the dichroic colorant adsorbed therein with a boric acid aqueous solution, and a step of washing the polyvinyl alcohol-based resin film with water after treatment with the boric acid aqueous solution.

Uniaxial stretching of the polyvinyl alcohol-based resin film can be performed before, simultaneously with or after coloring with the dichroic colorant. When uniaxial stretching is performed after coloring, this uniaxial stretching may be performed before or during boric acid treatment. Alternatively, uniaxial stretching may be performed at a plurality of these stages.

In uniaxial stretching, the polyvinyl alcohol-based resin film may be uniaxially stretched between rolls having different circumferential speeds, or may be uniaxially stretched by using a heat roll. In addition, uniaxial stretching may be dry stretching in which stretching is performed in the atmosphere, or may be wet stretching in which a solvent is used and stretching is performed with the polyvinyl alcohol-based resin film being swollen with the solvent. A stretching magnification is normally approximately 3 to 17, and preferably not lower than 4, and preferably not higher than 8.

As a method of coloring the polyvinyl alcohol-based resin film with the dichroic colorant, a method of immersing the polyvinyl alcohol-based resin film in an aqueous solution (coloring solution) containing the dichroic colorant can, for example, be used. The polyvinyl alcohol-based resin film is preferably subjected to treatment of immersion in water (swelling treatment) before coloring treatment.

When iodine is used as the dichroic colorant, a method of immersing the polyvinyl alcohol-based resin film in an aqueous solution containing iodine and potassium iodide and coloring the polyvinyl alcohol-based resin film is normally used. An amount of iodine contained in this coloring aqueous solution is normally approximately 0.01 to 1 parts by weight with respect to 100 parts by weight of water. In addition, an amount of contained potassium iodide is normally approximately 0.5 to 20 parts by weight with respect to 100 parts by weight of water. A temperature of the coloring aqueous solution is normally approximately 20 to 40° C. In addition, a time period of immersion in the coloring aqueous solution (coloring time period) is normally approximately 20 to 1800 seconds.

On the other hand, when the dichroic organic dye is used as the dichroic colorant, a method of immersing the polyvinyl alcohol-based resin film in a coloring aqueous solution including a water-soluble dichroic organic dye and coloring the polyvinyl alcohol-based resin film is normally used. An amount of the dichroic organic dye contained in the coloring aqueous solution is normally approximately $1\times10^{-4}$ to 10 parts by weight, and preferably approximately $1\times10^{-3}$ to 1 parts by weight, with respect to 100 parts by weight of water. This coloring aqueous solution may contain an inorganic salt of sodium sulfate and the like as a coloring aid. A temperature of the coloring aqueous solution is normally approximately 20 to 80° C. In addition, a time period of immersion in the coloring aqueous solution (coloring time period) is normally approximately 10 to 1800 seconds.

The boric acid treatment after coloring with the dichroic colorant can be performed by immersing the colored polyvinyl alcohol-based resin film in a boric acid-containing aqueous solution.

An amount of boric acid in the boric acid-containing aqueous solution is normally approximately 2 to 15 parts by weight, and preferably 5 to 12 parts by weight, with respect to 100 parts by weight of water. When iodine is used as the dichroic colorant, this boric acid-containing aqueous solution preferably contains potassium iodide. An amount of potassium iodide in the boric acid-containing aqueous solution is normally approximately 0.1 to 15 parts by weight, and preferably approximately 5 to 12 parts by weight, with respect to 100 parts by weight of water. A time period of immersion in the boric acid-containing aqueous solution is normally approximately 60 to 1200 seconds, preferably approximately 150 to 600 seconds, and more preferably approximately 200 to 400 seconds. A temperature of the boric acid-containing aqueous solution is normally not lower than 50° C., preferably 50 to 85° C., and more preferably 60 to 80° C.

The polyvinyl alcohol-based resin film subjected to boric acid treatment is normally subjected to water washing treatment. The water washing treatment can be performed, for example, by immersing the polyvinyl alcohol-based resin film subjected to boric acid treatment in water. A temperature of water in the water washing treatment is normally approximately 5 to 40° C. In addition, a time period of immersion is normally approximately 1 to 120 seconds.

After water washing, the drying treatment is performed and the polarizing film serving as polarizing layer 5 is obtained. The drying treatment can be performed by using a hot-air dryer or a far-infrared heater. A temperature of the drying treatment is normally approximately 30 to 100° C., and preferably 50 to 80° C. A time period of the drying treatment is normally approximately 60 to 600 seconds, and preferably 120 to 600 seconds.

By the drying treatment, a water content rate of the polarizing film is reduced to a practical level. This water content rate is normally 5 to 20 weight %, and preferably 8 to 15 weight %. If the water content rate is lower than 5 weight %, the flexibility of the polarizing film is lost and the polarizing film may be damaged or fractured after drying. If the water content rate exceeds 20 weight %, the thermal stability of the polarizing film may deteriorate.

First protective film 10 is bonded to one surface of the aforementioned polarizing film (polarizing layer 5) by using the active energy ray curing adhesive, and second protective film 20 is bonded to the other surface by using the water-soluble adhesive, and thereafter, the adhesive layer formed of the active energy ray curing adhesive is hardened by irradiating the obtained film stack with an active energy ray. Polarizing plate 1 can thus be obtained.

Examples of a method of bonding first and second protective films 10 and 20 to the polarizing film (polarizing layer 5) by using the active energy ray curing adhesive and the water-soluble adhesive can include a method of applying an adhesive to one or both bonding surfaces of two films to be bonded, and lying one film over the other with the adhesive layer being interposed. A casting method, a Meyer bar coating method, a gravure coating method, a comma coater method, a doctor blade method, a die coating method, a dip coating method, a spraying method or the like can, for example, be used to apply the adhesive. The casting method refers to a method of flowing down an adhesive over a surface of a film to be bonded and spreading the adhesive over the same while the film is moved substantially in a vertical direction, substantially in a horizontal direction, or in a diagonal direction between them. The film stack formed by lying one film over the other with the adhesive layer being interposed is normally passed between nip rolls (bonding rolls) or the like and pressed from above and below.

When the protective film is bonded to the polarizing film, the bonding surface of the protective film or the polarizing film can be subjected to easy adhesion treatment such as plasma treatment, corona treatment, ultraviolet irradiation treatment, flame treatment, and saponification treatment, in order to enhance adhesion. Among these, plasma treatment, corona treatment or saponification treatment is preferable. For example, when the protective film is composed of the cyclic polyolefin-based resin, the bonding surface of the protective film is normally subjected to plasma treatment or corona treatment. When the protective film is composed of the cellulose ester-based resin, the bonding surface of the protective film is normally subjected to saponification treatment. Examples of the saponification treatment include a method of immersion in an alkaline aqueous solution such as sodium hydroxide or potassium hydroxide.

After the aforementioned film bonding is performed, a drying step of drying the film stack in order to remove water included in the adhesive layer formed of the water-soluble adhesive is preferably performed. The drying can be performed, for example, by introducing the film stack into a drying furnace. A drying temperature (temperature in the drying furnace) is preferably 30 to 90° C. If the drying temperature is lower than 30° C., the protective film tends to be easily separated from the polarizing film. If the drying temperature exceeds 90° C., the polarization characteristics of the polarizing film may deteriorate by heat. A time period of drying can be approximately 10 to 1000 seconds, and from the perspective of productivity, the time period of drying is preferably 60 to 750 seconds, and more preferably 150 to 600 seconds.

After the drying step, an aging step of aging the film stack for approximately 12 to 600 hours at a room temperature or a temperature slightly higher than the room temperature, e.g., at a temperature of approximately 20 to 45° C., may be provided. An aging temperature is generally set to be lower than the drying temperature.

In addition, after the aforementioned film bonding is performed, a curing step of curing the adhesive layer formed of the active energy ray curing adhesive is performed. This curing of the adhesive layer can be performed by irradiating the film stack with an active energy ray. The active energy ray is normally provided from the first protective film 10 side. The active energy ray is preferably an ultraviolet ray.

Although a light source of the active energy ray is not particularly limited, an active energy ray having a light emission distribution in a region of wavelengths not longer than 400 nm is preferable. Specifically, a low-pressure mercury lamp, a medium-pressure mercury lamp, a high-pressure mercury lamp, a super-high-pressure mercury lamp, a chemical lamp, a black light lamp, a microwave excited mercury lamp, a metal halide lamp or the like is preferably used.

Intensity of irradiation of the adhesive layer formed of the active energy ray curing adhesive with the active energy ray is determined as appropriate depending on a composition of the adhesive. However, the irradiation intensity is preferably set such that irradiation intensity in a wavelength region effective for activation of a polymerization initiator is 0.1 to 6000 mW/cm². If the irradiation intensity is not lower than 0.1 mW/cm², the reaction time period is not excessively long. If the irradiation intensity is not higher than 6000 mW/cm², yellowing of the adhesive layer or deterioration of the polarizing film due to heat radiated from the light source and heat generation during curing of the adhesive is less likely.

A time period of irradiation with the active energy ray is also determined as appropriate depending on a composition of the adhesive. However, the time period of irradiation is preferably set such that a multiplied quantity of light represented as a product of the irradiation intensity and the irradiation time period above is 10 to 10000 mJ/cm². If the multiplied quantity of light is not smaller than 10 mJ/cm², active species derived from a polymerization initiator can be generated in a sufficient amount and the curing reaction can more reliably proceed. If the multiplied quantity of light is not larger than 10000 mJ/cm², the irradiation time period is not excessively long and good productivity can be maintained.

Irradiation with the active energy ray is preferably performed under such a condition that various functions of the polarizing plate do not decrease, such as a degree of polarization, transmissivity and a hue of the polarizing film, as well as transparency of the protective film.

When first protective film 10 and second protective film 20 are stacked on the polarizing film, one of the protective films may be stacked on the polarizing film and thereafter the other protective film may be stacked, or both of the protective films may be stacked on the polarizing film substantially simultaneously. Desirably, however, second protective film 20 is stacked by using the water-soluble adhesive, and thereafter, first protective film 10 is stacked by using the active energy ray curing adhesive. By first stacking second protective film 20 and forming the film stack thicker than the polarizing film alone, the aforementioned distortion occurring on the polarizing film or the protective film when bonding first protective film 10 and curing the active energy ray curing adhesive can be suppressed more effectively. As a result, the minor irregularities occurring on the surface of the polarizing plate can be suppressed more effectively.

The order of bonding of first and second protective films 10 and 20, the aforementioned drying step, and the aforementioned curing step may take various embodiments. Examples of the embodiments include:

1) an embodiment of simultaneously bonding first and second protective films 10 and 20, and thereafter, performing the drying step and the curing step in this order;

2) an embodiment of simultaneously bonding first and second protective films 10 and 20, and thereafter, performing the curing step and the drying step in this order;

3) an embodiment of performing bonding of second protective film 20, the drying step, bonding of first protective film 10, and the curing step in this order;

4) an embodiment of performing bonding of second protective film 20, bonding of first protective film 10, the drying step, and the curing step in this order;

5) an embodiment of performing bonding of second protective film 20, bonding of first protective film 10, the curing step, and the drying step in this order;

6) an embodiment of performing bonding of first protective film 10, the curing step, bonding of second protective film 20, and the drying step in this order;

7) an embodiment of performing bonding of first protective film 10, bonding of second protective film 20, the drying step, and the curing step in this order; and 8) an embodiment of performing bonding of first protective film 10, bonding of second protective film 20, the curing step, and the drying step in this order.

When bonding of first and second protective films 10 and 20 is performed sequentially, the embodiment of 3), 4) or 5) is preferable for the aforementioned reason.

The heat shrinkage force of polarizing layer 5 in polarizing plate 1 thus obtained can be measured as follows. Specifically, first protective film 10 and second protective film 20 are dissolved and only polarizing layer 5 is taken out, and then, with a direction of an absorption axis thereof (a direction of stretching) being a longer side, a film of 2 mm in width and 8 mm in length is cut out to obtain a sample for measurement, and the shrinkage force in a direction of the length of 8 mm generated when this sample is heated at 80° C. for 240 minutes with the dimension of this sample being kept constant is defined as the heat shrinkage force. A value of the heat shrinkage force is, for example, 0.5 N to 3.0 N, and preferably 1.0 N to 2.0 N.

[Manufacturing Method [b]]

FIG. 2 is a flowchart showing a preferred embodiment of a method of manufacturing a polarizing plate in accordance with the manufacturing method [b]. The manufacturing method shown in FIG. 2 includes the following steps in the listed order:

(1) a resin layer formation step S10 of applying a coating liquid containing a polyvinyl alcohol-based resin to at least one surface of a substrate film, and thereafter, drying the coated layer to form a polyvinyl alcohol-based resin layer and obtain a laminated film;

(2) a stretching step S20 of stretching the laminated film to obtain a stretched film;

(3) a coloring step S30 of coloring the polyvinyl alcohol-based resin layer of the stretched film with a dichroic colorant to form a polarizing layer and obtain a polarizing laminated film;

(4) a first bonding step S40 of bonding one of first and second protective films onto the polarizing layer of the polarizing laminated film to obtain a bonded film;

(5) a separation step S50 of separating and removing the substrate film from the bonded film to obtain a polarizing plate with the protective film on one surface; and (6) a second bonding step S60 of bonding the other protective film to a polarizing layer surface of the polarizing plate with the protective film on one surface.

The steps will be described hereinafter with reference to FIGS. 3 to 7.

(1) Resin Layer Formation Step S10

Figure 3:
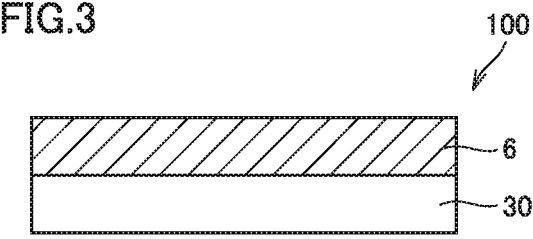
FIG. 3 is a schematic cross-sectional view showing one example of a layer configuration of a laminated film obtained in a resin layer formation step.

Referring to FIG. 3, this step is a step of forming a polyvinyl alcohol-based resin layer 6 on at least one surface of a substrate film 30 to obtain a laminated film 100. This polyvinyl alcohol-based resin layer 6 is a layer that will become polarizing layer 5 through stretching step S20 and coloring step S30. Polyvinyl alcohol-based resin layer 6 can be formed by applying a coating liquid containing a polyvinyl alcohol-based resin to one surface or both surfaces of substrate film 30 and drying the coated layer. The aforementioned method of forming the polyvinyl alcohol-based resin layer by coating is advantageous in that thin polarizing layer 5 is easily obtained.

(Substrate Film)

Substrate film 30 can be composed of a thermoplastic resin, and particularly, is preferably composed of a thermoplastic resin excellent in transparency, mechanical strength, thermal stability, ductility and the like. Specific examples of such a thermoplastic resin include: for example, a polyolefin-based resin such as an acyclic polyolefin-based resin and a cyclic polyolefin-based resin (a norbornene-based resin and the like); a polyester-based resin; a (meth)acryl-based resin; a cellulose ester-based resin such as cellulose triacetate and cellulose diacetate; a polycarbonate-based resin; a polyvinyl alcohol-based resin; a polyvinyl acetate-based resin; a polyarylate-based resin; a polystyrene-based resin; a polyether sulfone-based resin; a polysulfone-based resin; a polyamide-based resin; a polyimide-based resin; and a mixture thereof and a copolymer thereof.

Substrate film 30 may have a single layer structure including one resin layer composed of one type or two or more types of thermoplastic resins, or may have a multilayer structure formed by stacking a plurality of resin layers composed of one type or two or more types of thermoplastic resins.

Examples of the acyclic polyolefin-based resin can include a homopolymer of an acyclic olefin such as a polyethylene resin and a polypropylene resin, and a copolymer formed of two or more types of olefins. Substrate film 30 composed of the acyclic polyolefin-based resin is preferable in that substrate film 30 is easily stretched at a high ratio in a stable manner. Particularly, substrate film 30 is more preferably composed of a polypropylene-based resin (a polypropylene resin which is a homopolymer of propylene, and a copolymer mainly composed of propylene) or a polyethylene-based resin (a polyethylene resin which is a homopolymer of ethylene, and a copolymer mainly composed of ethylene).

The copolymer mainly composed of propylene, which is one of the examples suitably used as the thermoplastic resin constituting substrate film 30, is a copolymer of propylene and another monomer copolymerizable therewith.

Examples of another monomer copolymerizable with propylene can include ethylene and α-olefin. As α-olefin, α-olefin having a carbon number not smaller than 4 is preferably used and α-olefin having a carbon number of 4 to 10 is more preferably used. Specific examples of α-olefin having a carbon number of 4 to 10 include: for example, linear monoolefins such as 1-butene, 1-pentene, 1-hexene, 1-heptene, 1-octene, and 1-decene; branched monoolefins such as 3-methyl-1-butene, 3-methyl-1-pentene and 4-methyl-1-pentene; and vinylcyclohexane. The copolymer of propylene and another monomer copolymerizable therewith may be a random copolymer or a block copolymer.

An amount of aforementioned another monomer contained in the copolymer is, for example, 0.1 to 20 weight %, and preferably 0.5 to 10 weight %. The amount of another monomer contained in the copolymer can be determined by performing infrared (IR) spectrum measurement in accordance with the method described on page 616 of "Handbook of Polymer Analysis" (1995, published by Kinokuniya Company Ltd.).

Among the above, as the polypropylene-based resin, a homopolymer of propylene, a propylene-ethylene random copolymer, a propylene-1-butene random copolymer, or a propylene-ethylene-1-butene random copolymer is preferably used.

Stereoregularity of the polypropylene-based resin is preferably substantially isotactic or syndiotactic. Substrate film 30 composed of the polypropylene-based resin having substantially isotactic or syndiotactic stereoregularity is relatively good in its handleability and excellent in mechanical strength in a high-temperature environment.

The polyester-based resin is a resin having ester linkage, and is generally composed of a polycondensation product of polyvalent carboxylic acid or a derivative thereof and polyalcohol. Divalent dicarboxylic acid or a derivative thereof can be used as polyvalent carboxylic acid or a derivative thereof, and examples thereof include terephthalic acid, isophthalic acid, dimethyl terephthalate, dimethyl naphthalene dicarboxylate and the like. Divalent diol can be used as the polyalcohol, and examples thereof include ethylene glycol, propanediol, butanediol, neopentylglycol, cyclohexanedimethanol and the like.

Representative examples of the polyester-based resin include polyethylene terephthalate which is a polycondensation product of terephthalic acid and ethylene glycol. Although polyethylene terephthalate is a crystalline resin, polyethylene terephthalate before crystallization treatment is more easily subjected to treatment such as stretching. If necessary, the crystallization treatment can be performed by heat treatment or the like during or after stretching. In addition, copolymerized polyester having crystallinity lowered by copolymerization of a main chain of polyethylene terephthalate further with other types of monomers (or made amorphous) is also suitably used. Examples of such a resin include, for example, a resin copolymerized with cyclohexanedimethanol or isophthalic acid, and the like. These resins are also excellent in ductility, and thus, these resins can be suitably used.

Specific examples of the polyester-based resin other than polyethylene terephthalate and a copolymer thereof include, for example, polybutylene terephthalate, polyethylene naphthalate, polybutylene naphthalate, polytrimethylene terephthalate, polytrimethylene naphthalate, polycyclohexane dimethylterephthalate, polycyclohexane dimethylnaphthalate, and a mixture thereof, a copolymer thereof and the like.

The (meth)acryl-based resin is a resin including, as a main constituent monomer, a compound having a (meth)acryloyl group. Specific examples of the (meth)acryl-based resin include: for example, poly (meth)acrylic acid ester such as polymethylmethacrylate; a methyl methacrylate-(meth) acrylic acid copolymer; a methyl methacrylate-(meth) acrylic acid ester copolymer; a methyl methacrylate-acrylic acid ester-(meth)acrylic acid copolymer; a methyl (meth) acrylate-styrene copolymer (such as an MS resin); and a copolymer of methyl methacrylate and a compound having an alicyclic hydrocarbon group (e.g., a methyl methacrylate-cyclohexyl methacrylate copolymer, a methyl methacrylate-norbornyl (meth)acrylate copolymer and the like). A polymer mainly composed of poly (meth)acrylic acid $C_{1-6}$ alkyl ester such as poly methyl (meth)acrylate is preferably used, and a methyl methacrylate-based resin mainly composed of methyl methacrylate (50 to 100 weight %, and preferably 70 to 100 weight %) is more preferably used.

The polycarbonate-based resin is an engineering plastic composed of a polymer resulting from bonding of monomer units with a carbonate group being interposed, and is a resin having high shock resistance, heat resistance, flame resistance, and transparency. The polycarbonate-based resin constituting substrate film 30 may be a resin referred to as modified polycarbonate, as obtained by modifying a polymer main chain in order to lower a modulus of photoelasticity, copolymerized polycarbonate of which wavelength dependence has been improved, or the like.

Various products of the polycarbonate-based resin are commercially available. Examples of commercially available products of the polycarbonate-based resin include "Panlite" (manufactured by TEIJIN Chemicals Ltd.), "Iupilon" (manufactured by Mitsubishi Engineering-Plastics Corporation), "SD Polyca" (manufactured by Sumitomo Dow Limited), "CALIBRE" (manufactured by The Dow Chemical Company) and the like, all of which are trade names.

Among the above, the polypropylene-based resin is preferably used from the perspectives of ductility, heat resistance and the like.

As to the cyclic polyolefin-based resin and the cellulose ester-based resin that can be used for substrate film 30, the description about the protective films is cited. In addition, the acyclic polyolefin-based resin, the polyester-based resin, the (meth)acryl-based resin, and the polycarbonate-based resin described above in connection with substrate film 30 can also be used as a constituent material for the protective films.

Any appropriate additive may be added to substrate film 30, in addition to the aforementioned thermoplastic resin. Examples of such an additive include a UV absorber, an antioxidant, a lubricant, a plasticizer, a release agent, an anti-coloring agent, a flame retardant, a nucleating agent, an antistatic agent, a pigment, a coloring agent and the like. An amount of the thermoplastic resin contained in substrate film 30 is preferably 50 to 100 weight %, more preferably 50 to 99 weight %, further preferably 60 to 98 weight %, and particularly preferably 70 to 97 weight %. If the amount of the thermoplastic resin contained in substrate film 30 is lower than 50 weight %, high transparency or the like originally possessed by the thermoplastic resin may not be sufficiently exhibited.

A thickness of substrate film 30 can be determined as appropriate. Generally, however, from the perspectives of strength and workability such as handleability, the thickness of substrate film 30 is preferably 1 to 500 µm, more preferably 1 to 300 µm, further preferably 5 to 200 µm, and most preferably 5 to 150 µm.

A tensile elastic modulus of substrate film 30 at 80° C. is preferably 100 MPa to 1500 MPa, more preferably 140 MPa to 1000 MPa, and further preferably 150 MPa to 500 MPa. If the tensile elastic modulus is too low, the hardness of substrate film 30 is insufficient during stretching and a defect such as a wrinkle is likely to occur. If the tensile elastic modulus is too high, the workability in stretching becomes worse.

The tensile elastic modulus can be determined by cutting out substrate film 30 into a test piece of a prescribed size and performing a tensile test. In order to determine the tensile elastic modulus at 80° C., a tensile testing machine including a thermostatic bath is used.

(Coating Liquid Containing Polyvinyl Alcohol-Based Resin)

The coating liquid is preferably a polyvinyl alcohol-based resin solution obtained by dissolving a powder of a polyvinyl alcohol-based resin in a good solvent (e.g., water).

The coating liquid may contain an additive such as a plasticizer and a surfactant, as needed. As the plasticizer, polyol or a condensation product thereof can be used, and glycerin, diglycerin, triglycerin, ethylene glycol, propylene glycol, polyethylene glycol and the like are, for example, exemplified. A blending amount of the additive is suitably not larger than 20 weight % of the polyvinyl alcohol-based resin.

(Application of Coating Liquid and Drying of Coated Layer)

A method of applying the aforementioned coating liquid to substrate film 30 can be selected as appropriate from methods including: a wire bar coating method; a roll coating method such as reverse coating and gravure coating; a die coating method; a comma coating method; a lip coating method; a spin coating method; a screen coating method; a fountain coating method; a dipping method; a spraying method and the like.

When the coating liquid is applied to opposing surfaces of substrate film 30, the coating liquid can be applied to one surface and then to the other surface in turn by using the aforementioned method, or the coating liquid can be simultaneously applied to the opposing surfaces of substrate film 30 by using the dipping method, the spray coating method or any other special device.

A temperature and a time period of drying the coated layer (polyvinyl alcohol-based resin layer before drying) are set depending on the type of the solvent included in the coating liquid. The drying temperature is, for example, 50 to 200° C., and preferably 60 to 150° C. When the solvent includes water, the drying temperature is preferably not lower than 80° C. The drying time period is, for example, 2 to 20 minutes.

Polyvinyl alcohol-based resin layer 6 may be formed only on one surface of substrate film 30, or may be formed on both surfaces of substrate film 30. When polyvinyl alcohol-based resin layer 6 is formed on both surfaces, curl of the film that may occur during manufacturing of the polarizing laminated film can be suppressed, and in addition, two polarizing plates can be obtained from one polarizing laminated film, and thus, this is advantageous also in terms of production efficiency of the polarizing plate.

A thickness of polyvinyl alcohol-based resin layer 6 in laminated film 100 is preferably 3 to 60 µm, more preferably 3 to 30 µm, and further preferably 5 to 20 µm. Polyvinyl alcohol-based resin layer 6 having a thickness falling within this range can provide, through stretching step S20 and coloring step S30 described below, polarizing layer 5 which is good in coloring affinity of the dichroic colorant, excellent in polarization characteristics, and sufficiently small in thickness. If the thickness of polyvinyl alcohol-based resin layer 6 exceeds 60 µm, a thickness of polarizing layer 5 may exceed 20 µm. If the thickness of polyvinyl alcohol-based resin layer 6 is smaller than 3 µm, polarizing layer 5 tends to become too thin after stretching and the coloring affinity tends to become worse.

Prior to the application of the coating liquid, at least the surface of substrate film 30 on the side where polyvinyl alcohol-based resin layer 6 is formed may be subjected to corona treatment, plasma treatment, flame treatment or the like, in order to enhance adhesion between substrate film 30 and polyvinyl alcohol-based resin layer 6.

Prior to the application of the coating liquid, polyvinyl alcohol-based resin layer 6 may also be formed on substrate film 30 with a primer layer or an adhesive layer being interposed, in order to enhance adhesion between substrate film 30 and polyvinyl alcohol-based resin layer 6.

(Primer Layer)

The primer layer can be formed by applying a coating liquid for formation of the primer layer to the surface of substrate film 30, and thereafter, drying the coated surface. The coating liquid for formation of the primer layer includes a component that produces strong adhesion of a certain degree with both substrate film 30 and polyvinyl alcohol-based resin layer 6. Normally, the coating liquid for formation of the primer layer contains a solvent and a resin component that provides such adhesion. A thermoplastic resin excellent in transparency, thermal stability and ductility is preferably used as the resin component, and examples of the resin component include a (meth)acryl-based resin, a polyvinyl alcohol-based resin and the like. Among these, the polyvinyl alcohol-based resin that provides good adhesion is preferably used.

Examples of the polyvinyl alcohol-based resin include a polyvinyl alcohol resin and a derivative thereof. Examples of the derivative of the polyvinyl alcohol resin include: a substance obtained by modifying a polyvinyl alcohol resin with olefins such as ethylene and propylene; a substance obtained by modifying a polyvinyl alcohol resin with unsaturated carboxylic acids such as acrylic acid, methacrylic acid and crotonic acid; a substance obtained by modifying a polyvinyl alcohol resin with alkyl ester of unsaturated carboxylic acid; a substance obtained by modifying a polyvinyl alcohol resin with acrylamide, and the like, in addition to polyvinyl formal, polyvinyl acetal and the like. Among the aforementioned polyvinyl alcohol-based resins, the polyvinyl alcohol resin is preferably used.

A general organic solvent or water-soluble solvent that can dissolve the aforementioned resin component is normally used as the solvent. Examples of the solvent include: for example, aromatic hydrocarbons such as benzene, toluene and xylene; ketones such as acetone, methyl ethyl ketone and methyl isobutyl ketone; esters such as ethyl acetate and isobutyl acetate; chlorinated hydrocarbons such as methylene chloride, trichloroethylene and chloroform; and alcohols such as ethanol, 1-propanol, 2-propanol, and 1-butanol. When the primer layer is formed by using the coating liquid for formation of the primer layer including the organic solvent, substrate film 30 is dissolved in some cases, and thus, the solvent is preferably selected in consideration of the solubility of substrate film 30 as well. In consideration of the influence on the environment as well, the primer layer is preferably formed by using a coating liquid including water as a solvent.

In order to increase the strength of the primer layer, a cross-linker may be added to the coating liquid for formation of the primer layer. As the cross-linker, any appropriate cross-linker is selected as appropriate from known cross-linkers such as an organic cross-linker and an inorganic cross-linker, depending on the type of the used thermoplastic resin. Examples of the cross-linker include, for example, an epoxy-based cross-linker, an isocyanate-based cross-linker, a dialdehyde-based cross-linker, and a metallic cross-linker.

A one-component curing-type cross-linker and a two-component curing-type cross-linker can be both used as the epoxy-based cross-linker, and examples of the epoxy-based cross-linker include ethylene glycol diglycidylether, polyethylene glycol diglycidylether, glycerin di- or tri-glycidylether, 1,6-hexanediol diglycidylether, trimethylolpropane triglycidylether, diglycidylaniline, diglycidylamine and the like.

Examples of the isocyanate-based cross-linker include tolylene diisocyanate, hydrogenated tolylene diisocyanate, trimethylolpropane-tolylene diisocyanate adduct, triphenylmethane triisocyanate, methylenebis (4-phenylmethane) triisocyanate, isophorone diisocyanate, and a ketoxime block or a phenol block thereof, and the like.

Examples of the dialdehyde-based cross-linker include glyoxal, malondialdehyde, succindialdehyde, glutardialdehyde, maleic dialdehyde, phthaldialdehyde and the like.

Examples of the metallic cross-linker include a metal salt, a metal oxide, a metal hydroxide, and an organic metal compound. Examples of the metal salt, the metal oxide and the metal hydroxide include a salt, an oxide and a hydroxide of a metal having a valence of 2 or greater, such as magnesium, calcium, aluminum, iron, nickel, zirconium, titanium, silicon, boron, zinc, copper, vanadium, chromium, and tin.

The organic metal compound refers to a compound having, in a molecule, at least one structure in which an organic group is directly coupled to a metal atom or an organic group is coupled with an oxygen atom, a nitrogen atom or the like being interposed. The organic group refers to a monovalent or multivalent group including at least a carbon element, and can be, for example, an alkyl group, an alkoxy group, an acyl group or the like. In addition, coupling does not refer to only covalent coupling, and may be coordination coupling by coordination such as a chelate-like compound.

Suitable examples of the organic metal compound include an organic titanium compound, an organic zirconium compound, an organic aluminum compound, and an organic silicon compound. Only one type of organic metal compound may be used alone, or two or more types of organic metal compounds may be used together.

Examples of the organic titanium compound include: titanium orthoesters such as tetra-n-butyl titanate, tetraisopropyl titanate, butyl titanate dimer, tetra(2-ethylhexyl)titanate, and tetramethyl titanate; titanium chelates such as titanium acetylacetonato, titanium tetraacetylacetonato, polytitanium acetylacetonato, titanium octylene glycolate, titanium lactate, titanium triethanolaminato, and titanium ethylacetoacetate; and titanium acylates such as polyhydroxy titanium stearate, and the like.

Examples of the organic zirconium compound include zirconium-n-propionate, zirconium-n-butyrate, zirconium tetraacetylacetonato, zirconium monoacetylacetonato, zirconium bisacetylacetonato, zirconium acetylacetonato-bisethylacetoacetate and the like.

Examples of the organic aluminum compound include aluminum acetylacetonato, aluminum organic acid chelate and the like. Examples of the organic silicon compound include a compound in which a ligand previously exemplified in the organic titanium compound and the organic zirconium compound is coupled to silicon.

In addition to the low molecule-based cross-linker described above, a polymer-based cross-linker such as a methylolated melamine resin and a polyamide epoxy resin can also be used. Examples of commercially available products of the polyamide epoxy resin include "Sumirez Resin 650 (30)" and "Sumirez Resin 675" (all of which are trade names) sold by Taoka Chemical Company, Ltd., and the like.

When the polyvinyl alcohol-based resin is used as the resin component forming the primer layer, a polyamide epoxy resin, a methylolated melamine resin, a dialdehyde-based cross-linker, a metal chelate compound-based cross-linker or the like is suitably used as the cross-linker.

A ratio between the resin component and the cross-linker in the coating liquid for formation of the primer layer may be determined as appropriate from the range of approximately 0.1 to 100 parts by weight of the cross-linker, depending on the type of the resin component, the type of the cross-linker and the like, and is particularly preferably selected from the range of approximately 0.1 to 50 parts by weight. In addition, a solid content of the coating liquid for formation of the primer layer is preferably set to be approximately 1 to 25 weight %.

A thickness of the primer layer is preferably approximately 0.05 to 1 µm, and more preferably 0.1 to 0.4 µm. If the thickness of the primer layer is smaller than 0.05 μm, the effect of enhancing adhesion between substrate film 30 and polyvinyl alcohol-based resin layer 6 is small. If the thickness of the primer layer is greater than 1 μm, this is disadvantageous for reducing the thickness of the polarizing plate.

A method of applying the coating liquid for formation of the primer layer to substrate film 30 can be similar to that of the coating liquid for formation of the polyvinyl alcohol-based resin layer. The primer layer is applied to the surface (one surface or both surfaces of substrate film 30) to which the coating liquid for formation of the polyvinyl alcohol-based resin layer is applied. A drying temperature and a drying time period for the coated layer formed of the coating liquid for formation of the primer layer are set depending on the type of the solvent included in the coating liquid. The drying temperature is, for example, 50 to 200° C., and preferably 60 to 150° C. When the solvent includes water, the drying temperature is preferably not lower than 80° C. The drying time period is, for example, 30 seconds to 20 minutes.

When the primer layer is provided, the order of application to substrate film 30 is not particularly limited. For example, when polyvinyl alcohol-based resin layer 6 is formed on opposing surfaces of substrate film 30, the primer layer may be formed on the opposing surfaces of substrate film 30, and thereafter, polyvinyl alcohol-based resin layer 6 may be formed on the opposing surfaces. Alternatively, the primer layer and polyvinyl alcohol-based resin layer 6 may be formed on one surface of substrate film 30 in this order, and thereafter, the primer layer and polyvinyl alcohol-based resin layer 6 may be formed on the other surface of substrate film 30 in this order.

(2) Stretching Step S20

Figure 4:
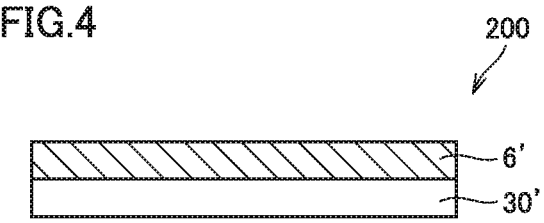
FIG. 4 is a schematic cross-sectional view showing one example of a layer configuration of a stretched film obtained in a stretching step.

Referring to FIG. 4, this step is a step of stretching laminated film 100 composed of substrate film 30 and polyvinyl alcohol-based resin layer 6, to obtain a stretched film 200 composed of stretched substrate film 30' and polyvinyl alcohol-based resin layer 6'.

A stretching magnification of laminated film 100 can be selected as appropriate depending on desired polarization characteristics. However, the stretching magnification of laminated film 100 is preferably higher than 5 and not higher than 17, and more preferably higher than 5 and not higher than 8, with respect to the original length of laminated film 100. If the stretching magnification is not higher than 5, polyvinyl alcohol-based resin layer 6 is not sufficiently oriented, and thus, a degree of polarization of polarizing layer 5 does not become sufficiently high in some cases. On the other hand, if the stretching magnification exceeds 17, a fracture of the film is more likely to occur during stretching, and in addition, a thickness of stretched film 200 becomes smaller than necessary, which may lead to lowering in workability and handleability in a subsequent step. The stretching treatment is normally uniaxial stretching.

The stretching treatment is not limited to stretching in a single step and can also be performed in multiple steps. In this case, the stretching treatment in all of the multiple steps may be performed successively before coloring step S30, or the stretching treatment in a second step or later may be performed simultaneously with coloring treatment and/or cross-linking treatment in coloring step S30. When the stretching treatment is performed in multiple steps as described above, the stretching treatment is preferably performed such that the stretching magnification is higher than 5 as the total of ratios in all steps in the stretching treatment.

The stretching treatment can be vertical stretching performed in a longitudinal direction of the film (transportation direction of the film), or may be lateral stretching performed in a width direction of the film, diagonal stretching or the like. Examples of the vertical stretching scheme include roll stretching performed by using rolls, compression stretching, stretching using chucks (clips), and the like. Examples of the lateral stretching scheme include a tenter method and the like. Although either a wet stretching method or a dry stretching method can be used as the stretching treatment, use of the dry stretching method is more preferable because a stretching temperature can be selected from a wider range.

The stretching temperature is set to be not lower than a temperature at which polyvinyl alcohol-based resin layer 6 and substrate film 30 as a whole exhibit a fluidity of such a degree that polyvinyl alcohol-based resin layer 6 and substrate film 30 can be stretched, and is preferably within a range of −30° C. to +30° C., and more preferably within a range of −30° C. to +5° C., and further preferably within a range of −25° C. to +0° C., of a phase transition temperature (melting point or glass transition temperature) of substrate film 30. When substrate film 30 is composed of a plurality of resin layers, the aforementioned phase transition temperature refers to the highest phase transition temperature, of the phase transition temperatures exhibited by the plurality of resin layers.

If the stretching temperature is lower than −30° C. of the phase transition temperature, a high stretching magnification of higher than 5 tends to be not easily achieved or the stretching treatment tends to become difficult because the fluidity of substrate film 30 is too low. If the stretching temperature exceeds +30° C. of the phase transition temperature, stretching tends to become difficult because the fluidity of substrate film 30 is too high. Since a high stretching magnification of higher than 5 is achieved more easily, the stretching temperature is within the aforementioned range, and further preferably not lower than 120° C. This is because, if the stretching temperature is not lower than 120° C., the stretching treatment is performed without difficulty even at a high stretching magnification of higher than 5.

Examples of a method of heating laminated film 100 in the stretching treatment include a zone heating method (e.g., a method of heating laminated film 100 in a stretching zone such as a heating furnace whose temperature is adjusted to a prescribed temperature by blowing the hot air), a method of heating rolls themselves in the case of stretching laminated film 100 by using the rolls, a heater heating method (a method of placing an infrared heater, a halogen heater, a panel heater or the like above and below laminated film 100, and heating laminated film 100 with radiation heat), and the like. In the roll stretching scheme, the zone heating method is preferable from the perspective of uniformity of the stretching temperature. In this case, a pair of two nip rolls may be placed inside the stretching zone having the adjusted temperature, or may be placed outside the stretching zone. However, in order to prevent adherence between laminated film 100 and the nip rolls, the pair of two nip rolls are preferably placed outside the stretching zone.

The stretching temperature refers to an atmospheric temperature in the zone (e.g., in the heating furnace) in the case of the zone heating method, and refers to an atmospheric temperature in a furnace in the case of performing heating in the furnace in the heater heating method as well. In addition, the stretching temperature refers to a surface temperature of the rolls in the case of the method of heating the rolls themselves.

Prior to stretching step S20, a preheating treatment step of preheating laminated film 100 may be provided. A method similar to the heating method in the stretching treatment can be used as a preheating method. When the stretching treatment scheme is roll stretching, preheating may be performed at any timing of before, during and after passage through the nip roll on the upstream side. When the stretching treatment scheme is heat roll stretching, preheating is preferably performed before passage through the heat roll. When the stretching treatment scheme is stretching using the chucks, preheating is preferably performed before widening a distance between the chucks. A preheating temperature is preferably within a range of −50° C. to ±0° of the stretching temperature, and more preferably within a range of −40° C. to −10° C. of the stretching temperature.

A heat fixation treatment step may also be provided after the stretching treatment in stretching step S20. The heat fixation treatment is treatment of performing heat treatment at a temperature not lower than a crystallization temperature while maintaining an end of stretched film 200 in a tension state with the end grasped by a clip. By this heat fixation treatment, crystallization of polyvinyl alcohol-based resin layer 6' is promoted. A temperature of the heat fixation treatment is preferably within a range of −0° C. to −80° C. of the stretching temperature, and more preferably within a range of −0° C. to −50° C. of the stretching temperature.

(3) Coloring Step S30

Figure 5:
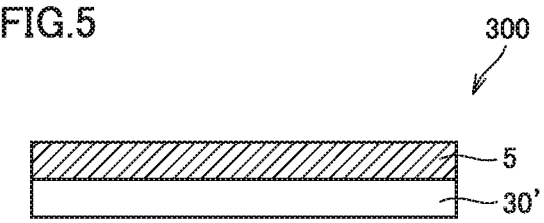
FIG. 5 is a schematic cross-sectional view showing one example of a layer configuration of a polarizing laminated film obtained in a coloring step.

Referring to FIG. 5, this step is a step of coloring polyvinyl alcohol-based resin layer 6' of stretched film 200 with a dichroic colorant and adsorbing and orienting the dichroic colorant to obtain polarizing layer 5. Through this step, a polarizing laminated film 300 having polarizing layer 5 stacked on one surface or both surfaces of substrate film 30' is obtained.

The coloring step can be performed by immersing stretched film 200 as a whole in a solution (coloring solution) containing the dichroic colorant. A solution having the aforementioned dichroic colorant in a solvent can be used as the coloring solution. Water is generally used as the solvent of the coloring solution. However, an organic solvent compatible with water may be further added. A concentration of the dichroic colorant in the coloring solution is preferably 0.01 to 10 weight %, more preferably 0.02 to 7 weight %, and further preferably 0.025 to 5 weight %.

When iodine is used as the dichroic colorant, an iodide is preferably further added to the coloring solution containing iodine because the efficiency in coloring can be further enhanced. Examples of the iodide include potassium iodide, lithium iodide, sodium iodide, zinc iodide, aluminum iodide, lead iodide, copper iodide, barium iodide, calcium iodide, tin iodide, titanium iodide and the like. A concentration of the iodide in the coloring solution is preferably 0.01 to 20 weight %. Among the iodides, potassium iodide is preferably added. When potassium iodide is added, a ratio in weight ratio between iodine and potassium iodide is preferably within a range of 1:5 to 1:100, more preferably within a range of 1:6 to 1:80, and further preferably within a range of 1:7 to 1:70.

A time period of immersion of stretched film 200 in the coloring solution is normally within a range of 15 seconds to 15 minutes, and preferably within a range of 30 seconds to 3 minutes. In addition, a temperature of the coloring solution is preferably within a range of 10 to 60° C., and more preferably within a range of 20 to 40° C.

Stretched film 200 may be further subjected to additional stretching treatment during coloring step S30. Examples of an embodiment in this case can include: 1) an embodiment of performing stretching treatment at a magnification lower than a target magnification in aforementioned stretching step S20, and thereafter, performing stretching treatment during coloring treatment in coloring step S30 such that a total stretching magnification becomes the target magnification; and as described below, in the case of performing cross-linking treatment after coloring treatment, 2) an embodiment of performing stretching treatment at a magnification lower than a target magnification in aforementioned stretching step S20, and thereafter, performing stretching treatment during coloring treatment in coloring step S30 to such an extent that a total stretching magnification does not reach the target magnification, and then, performing stretching treatment during cross-linking treatment such that a final total stretching magnification becomes the target magnification, and other embodiments.

Coloring step S30 can include a cross-linking treatment step performed following the coloring treatment. The cross-linking treatment can be performed by immersing the colored film in a solution (cross-linking solution) including a cross-linker. A conventionally known substance can be used as the cross-linker, and examples of the cross-linker include a boron compound such as boric acid and borax, glyoxal, glutaraldehyde and the like. Only one type of cross-linker may be used alone, or two or more types of cross-linkers may be used together.

The cross-linking solution can specifically be a solution having the cross-linker dissolved in a solvent. Although water can, for example, be used as the solvent, the solvent may further include an organic solvent compatible with water. A concentration of the cross-linker in the cross-linking solution is preferably within a range of 1 to 20 weight %, and more preferably within a range of 6 to 15 weight %.

The cross-linking solution can include an iodide. By adding the iodide, polarization characteristics in a plane of polarizing layer 5 can be made more uniform. Examples of the iodide include potassium iodide, lithium iodide, sodium iodide, zinc iodide, aluminum iodide, lead iodide, copper iodide, barium iodide, calcium iodide, tin iodide, titanium iodide and the like. A concentration of the iodide in the cross-linking solution is preferably 0.05 to 15 weight %, and more preferably 0.5 to 8 weight %.

A time period of immersion of the colored film in the cross-linking solution is normally 15 seconds to 20 minutes, and preferably 30 seconds to 15 minutes. In addition, a temperature of the cross-linking solution is preferably within a range of 10 to 90° C.

The cross-linking treatment can also be performed simultaneously with the coloring treatment, by blending the cross-linker in the coloring solution. In addition, the stretching treatment may be performed during the cross-linking treatment. A specific embodiment of performing the stretching treatment during the cross-linking treatment is as described above.

A cleaning step and a drying step are preferably performed after coloring step S30 and before first bonding step S40 described below. The cleaning step normally includes a water cleaning step. The water cleaning treatment can be performed by immersing the film subjected to coloring treatment or cross-linking treatment in purified water such as ion exchange water and distilled water. A water cleaning temperature is normally within a range of 3 to 50° C., and preferably within a range of 4 to 20° C. A time period of immersion in water is normally 2 to 300 seconds, and preferably 3 to 240 seconds.

The cleaning step may be a combination of the water cleaning step and a cleaning step with an iodide solution. In addition to water, liquid alcohol such as methanol, ethanol, isopropyl alcohol, butanol, and propanol can be contained as appropriate in a cleaning liquid used in the water cleaning step and a cleaning liquid in the cleaning treatment with the iodide solution.

Any appropriate method such as natural drying, air-blown drying and heated drying can be used as the drying step performed after the cleaning step. For example, in the case of heated drying, a drying temperature is normally 20 to 95° C., and a drying time period is normally approximately 1 to 15 minutes.

(4) First Bonding Step S40

Figure 6:
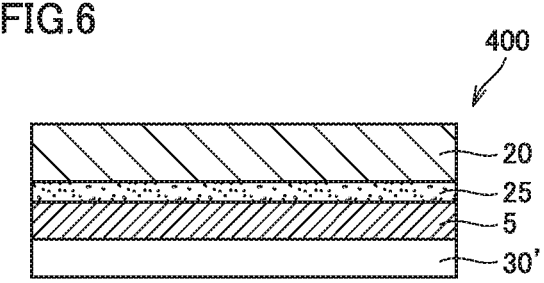
FIG. 6 is a schematic cross-sectional view showing one example of a layer configuration of a bonded film obtained in a first bonding step.

Referring to FIG. 6, this step is a step of bonding one of first and second protective films 10 and 20 onto polarizing layer 5 of polarizing laminated film 300, i.e., a surface of polarizing layer 5 opposite to the substrate film 30' side, to obtain a bonded film 400. When polarizing laminated film 300 has polarizing layers 5 on the opposing surfaces of substrate film 30', the protective films are normally bonded to polarizing layers 5 on the opposing surfaces. In this case, these protective films may be protective films of the same type, or may be protective films of different types.

Although the protective film bonded in this step may be any one of first protective film 10 and second protective film 20, second protective film 20 is desirably bonded by using the water-soluble adhesive as in the example shown in FIG. 6. This is because, in the manufacturing method [b], substrate film 30' is included in polarizing laminated film 300, and substrate film 30' has a small tensile elastic modulus to obtain workability in stretching, and thus, when first protective film 10 is bonded in first bonding step S40, the effect of suppressing distortion occurring on polarizing layer 5 and the protective film, and therefore, the minor irregularities occurring on the surface of polarizing plate 1, when the active energy ray curing adhesive is hardened is weakened. By bonding second protective film 20 using the water-soluble adhesive, distortion occurring on polarizing layer 5 and the protective film, and therefore, the minor irregularities occurring on the surface of the polarizing plate, when first protective film 10 is bonded and the active energy ray curing adhesive is hardened in second bonding step S60 described below can be suppressed more effectively, for the reason similar to the above.

As to a method of bonding second protective film 20 by using the water-soluble adhesive and a method of bonding first protective film 10 by using the active energy ray curing adhesive, the description about the aforementioned manufacturing method [a] is cited.

(5) Separation Step S50

Figure 7:
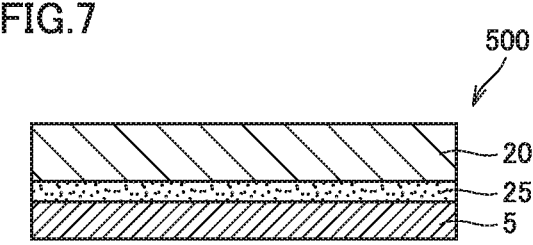
FIG. 7 is a schematic cross-sectional view showing one example of a layer configuration of a polarizing plate with a protective film on one surface obtained in a separation step.

Referring to FIG. 7, this step is a step of separating and removing substrate film 30' from bonded film 400 obtained by bonding one of first and second protective films 10 and 20. Through this step, a polarizing plate 500 with the protective film on one surface, which has the protective film stacked on one surface of polarizing layer 5, is obtained. When polarizing laminated film 300 has polarizing layers 5 on the opposing surfaces of substrate film 30' and the protective films are bonded to both of these polarizing layers 5, two polarizing plates 500, each of which has the protective film on one surface, are obtained from one polarizing laminated film 300 through this separation step S50.

A method of separating and removing substrate film 30' is not particularly limited, and separation can be achieved by a method similar to a step of separating a separator (separation film), which is normally performed in a polarizing plate with a pressure sensitive adhesive. Substrate film 30' may be separated immediately after first bonding step S40, or may be wound up once into a roll after first bonding step S40 and then wound off and separated in a subsequent step.

(6) Second Bonding Step S60

This step is a step of bonding the other protective film onto polarizing layer 5 of the polarizing plate with the protective film on one surface, i.e., a surface on the opposite side of the protective film bonded in first bonding step S40, by using the adhesive, to obtain polarizing plate 1 shown in FIG. 1A. When second protective film 20 is bonded in first bonding step S40, first protective film 10 is bonded by using the active energy ray curing adhesive in this step. When first protective film 10 is bonded in first bonding step S40, second protective film 20 is bonded by using the water-soluble adhesive in this step.

As to a method of bonding first protective film 10 by using the active energy ray curing adhesive and a method of bonding second protective film 20 by using the water-soluble adhesive, the description about the aforementioned manufacturing method [a] is cited.

<Polarizing Plate with Pressure Sensitive Adhesive Layer>

Polarizing plate 1 of the present invention can become a polarizing plate with a pressure sensitive adhesive layer, by providing transparent pressure sensitive adhesive layer 3 on an outer surface (surface on the opposite side of polarizing layer 5) of first protective film 10 or second protective film 20 of polarizing plate 1. This transparent pressure sensitive adhesive layer 3 can be used to bond polarizing plate 1 to substrate 4 such as a glass substrate. A stack having polarizing plate 1 bonded to substrate 4 with transparent pressure sensitive adhesive layer 3 being interposed is herein also referred to as "substrate having the polarizing plate bonded thereto". In the polarizing plate with the pressure sensitive adhesive layer, transparent pressure sensitive adhesive layer 3 may be provided on either the first protective film 10 side or the second protective film 20 side. As described above, however, according to the present invention, particularly because the occurrence of the minor irregularities on the outer surface (surface on the opposite side of polarizing layer 5) of second protective film 20 can be suppressed or prevented more effectively, transparent pressure sensitive adhesive layer 3 is preferably provided on the outer surface of first protective film 10 and the outer surface of second protective film 20, where the occurrence of the minor irregularities is suppressed or prevented more effectively, faces outward in the polarizing plate with the pressure sensitive adhesive layer.

A so-called separation film for protecting transparent pressure sensitive adhesive layer 3 from foreign substances such as dust is normally bonded to an outer surface of transparent pressure sensitive adhesive layer 3 in the polarizing plate with the pressure sensitive adhesive layer. The separation film is separated before polarizing plate 1 is bonded to substrate 4 such as a glass substrate with transparent pressure sensitive adhesive layer 3 being interposed.

The glass substrate to which the polarizing plate with the pressure sensitive adhesive layer is bonded is normally a substrate made of inorganic glass or organic glass and having a surface formed of a flat surface. A substrate other than the glass substrate is normally a substrate having a surface formed of a flat surface. The polarizing plate with the pressure sensitive adhesive layer can be stacked on this flat surface. In the case where the polarizing plate with the pressure sensitive adhesive layer is stacked on the flat surface of the substrate, the poor appearance caused by the minor irregularities present on the surface of the protective film is easily noticeable when the substrate having the polarizing plate bonded thereto is viewed from the polarizing plate side, and thus, the present invention is preferably applied in such a case. The flat surface refers to a surface having an arithmetic average roughness Ra of not greater than 200 nm, preferably not greater than 10 nm, and ideally 0 mm, which is defined in accordance with JIS B 0601-2001. Arithmetic average roughness Ra can be measured by using a confocal microscope. The glass substrate to which the polarizing plate with the pressure sensitive adhesive layer is bonded may be a substrate constituting an image display element such as, for example, a liquid crystal cell and an organic electroluminescence (EL) display element.

<Image Display Device>

Figure 11:
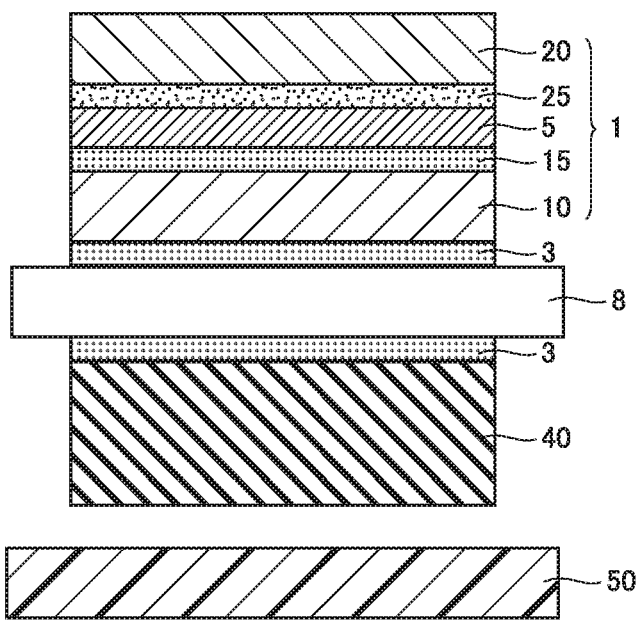
FIG. 11 is a schematic cross-sectional view showing one example of a liquid crystal display device according to the present invention.
Figure 12:
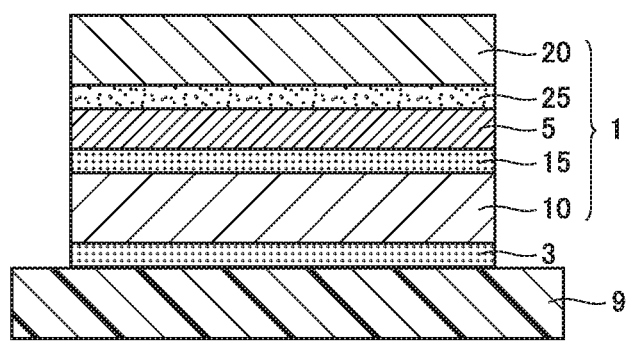
FIG. 12 is a schematic cross-sectional view showing one example of an organic electroluminescence display device according to the present invention.

An image display device according to the present invention includes polarizing plate 1 of the present invention described above and an image display element. As described above, polarizing plate 1 is bonded to one surface or both surfaces of the image display element with transparent pressure sensitive adhesive layer 3 being interposed, and is preferably bonded to a surface of the image display element on the first protective film 10 side. FIGS. 11 and 12 show an example of the image display device according to the present invention. FIG. 11 is a schematic cross-sectional view showing one example of a liquid crystal display device, and FIG. 12 is a schematic cross-sectional view showing one example of an organic EL display device.

The liquid crystal display device shown in FIG. 11 includes: a liquid crystal cell 8; polarizing plate 1 according to the present invention stacked on a front surface (viewing side) of liquid crystal cell 8 with transparent pressure sensitive adhesive layer 3 being interposed; a back-side polarizing plate 40 stacked on a back surface (backlight side) of liquid crystal cell 8 with transparent pressure sensitive adhesive layer 3 being interposed; and a backlight 50 arranged on the back surface side of back-side polarizing plate 40. Liquid crystal cell 8 can have such a conventionally known configuration that a liquid crystal layer is interposed between two glass substrates. Polarizing plate 1 and back-side polarizing plate 40 can be bonded to surfaces of these glass substrates with transparent pressure sensitive adhesive layer 3 being interposed. Although back-side polarizing plate 40 and backlight 50 may also have a conventionally known configuration, polarizing plate 1 according to the present invention may be used not only for the front-side polarizing plate but also for back-side polarizing plate 40.

According to the present invention, particularly because the occurrence of the minor irregularities on the outer surface (surface on the opposite side of polarizing layer 5) of second protective film 20 can be suppressed or prevented more effectively, the liquid crystal display device is preferably configured such that polarizing plate 1 is bonded to the viewing side of liquid crystal cell 8 on the first protective film 10 side and the outer surface of second protective film 20 faces the side opposite to liquid crystal cell 8 (i.e., the viewing side).

In the case where the glass substrate surface of liquid crystal cell 8 on which polarizing plate 1 is stacked with transparent pressure sensitive adhesive layer 3 being interposed is flat, the poor appearance caused by the minor irregularities present on the surface of the protective film is easily noticeable when the liquid crystal display device is viewed from the polarizing plate 1 side. However, according to the present invention, the liquid crystal display device with good appearance can be provided even when the glass substrate surface is flat.

In the case where a surface treatment layer, particularly a hard coat layer, an antireflective layer, an electroconductive layer or the like, is formed on the surface of second protective film 20 constituting polarizing plate 1, the minor irregularities are further easily noticeable when the minor irregularities are present on the surface of second protective film 20. Therefore, the configuration of the present invention is preferably applied in such a case.

The organic EL display device shown in FIG. 12 includes: an organic EL display element 9; and polarizing plate 1 according to the present invention stacked on a front surface (viewing side) of organic EL display element 9 with transparent pressure sensitive adhesive layer 3 being interposed. Organic EL display element 9 can have such a conventionally known configuration that a light emitting layer composed of an organic light emitting material or another organic layer provided as needed is sandwiched between a pair of electrodes. A substrate such as a glass substrate is normally stacked on at least one electrode. Polarizing plate 1 can be bonded to a surface of this glass substrate with transparent pressure sensitive adhesive layer 3 being interposed.

In the organic EL display device, the protective film on the organic EL display element 9 side, of the protective films possessed by polarizing plate 1, is a protective film (phase retardation film) having an in-plane phase retardation. An in-plane phase retardation value $R_0$ of this protective film is normally within a range of 100 to 180 nm. In addition, the protective film (phase retardation film) on the organic EL display element 9 side is stacked on polarizing layer 5 such that an angle of a slow axis of this protective film with respect to an absorption axis of polarizing layer 5 is substantially 45° or substantially 135°. Substantially 45° or substantially 135° refers to 45°±10° or 135°±10° (preferably 45°±5° or 135°±5°). Namely, polarizing plate 1 in this case is an oval (circular) polarizing plate. By stacking such polarizing plate 1 on the viewing side of organic EL display element 9, the antireflective function can be provided to the organic EL display device. In-plane phase retardation value $R_0$ can be defined in accordance with the following equation:

$$R_0 = (n_x - n_y) \times d.$$

In the aforementioned equation, $n_x$ represents a refractive index in a direction of an in-plane slow axis, $n_y$ represents a refractive index in a direction of an in-plane fast axis (direction perpendicular to the direction of the in-plane slow axis), and d represents a thickness of the protective film.

According to the present invention, particularly because the occurrence of the minor irregularities on the outer surface (surface on the opposite side of polarizing layer 5) of second protective film 20 can be suppressed or prevented more effectively, the organic EL display device is preferably configured such that polarizing plate 1 is bonded to the viewing side of organic EL display element 9 on the first protective film 10 side and the outer surface of second protective film 20 faces the side opposite to organic EL display element 9 (i.e., the viewing side).

In the case where the glass substrate surface of organic EL display element 9 on which polarizing plate 1 is stacked with transparent pressure sensitive adhesive layer 3 being interposed, the poor appearance caused by the minor irregularities present on the surface of the protective film is easily noticeable when the organic EL display device is viewed from the polarizing plate 1 side. However, according to the present invention, the organic EL display device with good appearance can be provided even when the glass substrate surface is flat.

In the case where a surface treatment layer, particularly a hard coat layer, an antireflective layer, an electroconductive layer or the like, is formed on the surface of second protective film 20 constituting polarizing plate 1, the minor irregularities are further easily noticeable when the minor irregularities are present on the surface of second protective film 20. Therefore, the configuration of the present invention is preferably applied in such a case.

When the image display device has, for example, any of the following configurations, the poor appearance caused by the minor irregularities present on the surface of the protective film on the viewing side is easily noticeable. Therefore, the polarizing plate according to the present invention is preferably applied in any of the following configulations.

[A] The case in which the image display device is portable (mobile). In this case, a screen is stared from a relatively close distance, and thus, even slight minor irregularities are easily recognized as the poor appearance. A shape and a size of the polarizing plate applied to the portable image display device are, for example, a rectangular shape having a diagonal length of 3 to 32 cm, and preferably a rectangular shape having a diagonal length of 7 to 15 cm.

[B] The case in which a resolution of the display screen of the image display device is high or the case in which the display screen of the image display device is capable of color display. In these cases as well, a displayed image is clean, and thus, the minor irregularities are easily noticeable. The case of the resolution being high refers to, for example, the case of the resolution being not lower than 300 dpi.

[C] The case in which the image display device is a liquid crystal display device using a normally black-type liquid crystal cell in which an image is displayed in black color when a voltage is not applied. In this case, completely black display is obtained when an image is turned off, and thus, the minor irregularities are easily noticeable.

[D] The case in which the hard coat layer or the antireflective layer is provided on the outer surface (surface on the opposite side of the polarizing layer) of the protective film on the viewing side in the polarizing plate arranged on the front surface (viewing) side of the image display element. In this case as well, the minor irregularities are easily noticeable.

[E] The case in which the viewing side of the polarizing plate arranged on the front surface (viewing) side of the image display element is an air layer. In this case as well, the minor irregularities are easily noticeable. Examples of the image display device having such a configuration include an image display device configured such that the viewing side of the aforementioned polarizing plate is exposed to the atmosphere, and an image display device configured such that a transparent plate such as a cover glass and a touch panel is arranged on the viewing side of the aforementioned polarizing plate with the air layer being interposed.

[F] The case in which the electroconductive layer is provided on the outer surface (surface on the opposite side of the polarizing layer) of the protective film on the viewing side in the polarizing plate arranged on the front surface (viewing) side of the image display element. In this case as well, an optical reflectivity of many electroconductive layers is relatively high due to a refractive index thereof, and thus, the minor irregularities are easily noticeable. Examples of the electroconductive layer include a layer formed of ATO (antimony tin oxide), ITO (indium tin oxide) or the like, and others.

EXAMPLES

The present invention will be further specifically described with reference to Examples. However, the present invention is not limited by these Examples.

Reference Example (1) Fabrication of Polarizing Layer (Polarizing Film)

A polyvinyl alcohol film having an average degree of polymerization of about 2400, a degree of saponification of not lower than 99.9 mol % and a thickness of 75 μm was uniaxially stretched by dry stretching with a stretching magnification of about 5, and was further immersed in purified water at 60° C. for 1 minute with the tension state being maintained, and thereafter, was immersed at 28° C. for 60 seconds in an aqueous solution in which a weight ratio of iodine/potassium iodide/water was 0.05/5/100. Thereafter, the polyvinyl alcohol film was immersed at 72° C. for 300 seconds in an aqueous solution in which a weight ratio of potassium iodide/boric acid/water was 8.5/8.5/100. Subsequently, the polyvinyl alcohol film was cleaned with purified water at 26° C. for 20 seconds, and thereafter, was dried at 65° C. Thus, a polarizing film having iodine adsorbed and oriented in the uniaxially stretched polyvinyl alcohol film was fabricated. A thickness of the polarizing film was 28 μm.

(2) Preparation of Ultraviolet Curing Adhesive

The following components were mixed and defoamed to prepare an ultraviolet curing resin adhesive in a liquid state:

| | |
|---|---|
| 3,4-epoxycyclohexylmethyl 3,4-epoxycyclohexanecarboxylate | 75 parts |
| 1,4-butanediol diglycidyl ether | 20 parts |
| 2-ethylhexyl glycidyl ether | 5 parts |
| triarylsulfonium hexafluorophosphate-based photocationic polymerization initiator | 2.25 parts. |

A photocationic polymerization initiator obtained in a form of 50% propylene carbonate solution was used as the photocationic polymerization initiator. The blending amount (2.25 parts) described above was an amount of solid content.

(3) Bonding of Protective Film

A second protective film [trade name: "KC4UY" which is a TAC film manufactured by Konica Minolta Optics, Inc.] having a thickness of 40 μm was prepared, and the ultraviolet curing adhesive prepared in the above was applied to one surface of the second protective film by using a micro gravure coater, and this was bonded to one surface of the aforementioned polarizing film. Thereafter, by using an ultraviolet ray irradiation device with a belt conveyor to which an ultraviolet lamp, "D Valve", manufactured by Fusion UV Systems Inc. was attached, irradiation with an ultraviolet ray was performed such that a multiplied quantity of light became 250 mJ/cm$^2$, to harden the ultraviolet curing adhesive. Next, a first protective film [trade name: "ZEONOR Film ZF14-023", which is a cyclic polyolefin-based resin film manufactured by ZEON Corporation, having a bonding surface thereof subjected to corona treatment] having a thickness of 23 μm was prepared, and the same ultraviolet curing adhesive was applied to the corona-treated surface by using the micro gravure coater, and this was bonded to the other surface of the polarizing film. Thereafter, irradiation with an ultraviolet ray was similarly performed to harden the ultraviolet curing adhesive. Thus, a polarizing plate having a layer configuration of second protective film (40 μm)/ultraviolet curing adhesive layer/ polarizing film (28 μm)/ultraviolet curing adhesive layer/ first protective film (23 μm) was obtained. A thickness of each adhesive layer subjected to curing was 1.0 μm.

Comparative Example 1

(1) Primer Layer Formation Step

Polyvinyl alcohol powders [trade name: "Z-200" manufactured by The Nippon Synthetic Chemical Industry Co., Ltd., an average degree of polymerization of 1100, a degree of saponification of 99.5 mol %] were dissolved in hot water at 95° C., to prepare a polyvinyl alcohol aqueous solution having a concentration of 3 weight %. A cross-linker [trade name: "Sumirez Resin 650" manufactured by Taoka Chemical Company, Ltd.] was mixed in the obtained aqueous solution by 5 parts by weight with respect to 6 parts by weight of the polyvinyl alcohol powders, to obtain a coating liquid for formation of a primer layer.

A substrate film [upstretched polypropylene film having a thickness of 110 μm, melting point of 163° C.] was prepared, and one surface of the substrate film was subjected to corona treatment. Then, the aforementioned coating liquid for formation of a primer layer was applied to the corona-treated surface by using the micro gravure coater, and was dried at 80° C. for 10 minutes, to form a primer layer having a thickness of 0.2 μm. A tensile elastic modulus at 80° C. of the substrate film was measured by using a universal testing machine, "Autograph AG-I", manufactured by Shimadzu Corporation including a thermostatic bath. The tensile elastic modulus was 200 MPa.

(2) Resin Layer Formation Step

Polyvinyl alcohol powders [trade name: "PVA124" manufactured by Kuraray Co., Ltd., an average degree of polymerization of 2400, a degree of saponification of 98.0 to 99.0 mol %] were dissolved in hot water at 95° C., to prepare a polyvinyl alcohol aqueous solution having a concentration of 8 weight %. This was used as a coating liquid for formation of a polyvinyl alcohol-based resin layer.

By using a lip coater, the aforementioned coating liquid for formation of a polyvinyl alcohol-based resin layer was applied to a primer layer surface of the substrate film having the primer layer fabricated in (1) above, and was dried at 80° C. for 2 minutes. Thus, a three-layer laminated film composed of substrate film/primer layer/polyvinyl alcohol-based resin layer was fabricated.

(3) Stretching Step

By using a tenter device, free-end uniaxial stretching was performed at 160° C. with a stretching magnification of 5.8 to the laminated film fabricated in (2) above, to obtain a stretched film. A thickness of the polyvinyl alcohol-based resin layer subjected to stretching was 6.1 μm.

(4) Coloring Step

The stretched film fabricated in (3) above was immersed in a coloring aqueous solution including iodine and potassium iodide (including 0.35 parts by weight of iodine and 10 parts by weight of potassium iodide with respect to 100 parts by weight of water) at 30° C., and coloring treatment of the polyvinyl alcohol-based resin layer was performed. Then, an excessive coloring solution was washed away with purified water at 10° C. Subsequently, the film was immersed for 300 seconds in a cross-linking aqueous solution including boric acid and potassium iodide (including 9.5 parts by weight of boric acid and 5 parts by weight of potassium iodide with respect to 100 parts by weight of water) at 76° C., and cross-linking treatment was performed. Thereafter, the film was cleaned for 10 seconds with purified water at 10° C. and dried at 80° C. for 200 seconds. Thus, a polarizing laminated film having a polarizing layer on one surface of the substrate film was obtained.

(5) First Bonding Step

The same ultraviolet curing adhesive as that used in Reference Example was applied to one surface of the same second protective film as that used in Reference Example by using the micro gravure coater, and the second protective film was bonded to a surface of the polarizing layer of the polarizing laminated film fabricated in (4) above, wherein the surface is a surface on the opposite side of the substrate film. Next, irradiation with an ultraviolet ray was performed from the substrate film side under the same conditions as those in Reference Example, to harden the adhesive layer. Thus, a five-layer film composed of substrate film/primer layer/polarizing layer/ultraviolet curing adhesive layer/second protective film was obtained. A thickness of the polarizing layer was 6.1 μm.

(6) Separation Step and Second Bonding Step

The substrate film was separated and removed from the five-layer-structure film fabricated in (5) above, to obtain a polarizing plate with the protective film on one surface. The substrate film was able to be separated easily. Next, the same ultraviolet curing adhesive as that used in Reference Example was applied to one surface of the same first protective film as that used in Reference Example by using the micro gravure coater, and this was bonded to a primer layer surface in the aforementioned polarizing plate with the protective film on one surface. Next, irradiation with an ultraviolet ray was performed from the first protective film side under the same conditions as those in Reference Example, to harden the adhesive layer. Thus, a polarizing plate having a configuration similar to that in FIG. 1A was obtained. A thickness of each adhesive layer subjected to curing was 1.0 μm.

Example 1

(1) Fabrication of Polarizing Laminated Film

Similarly to Comparative Example 1, a polarizing laminated film having a polarizing layer on one surface of a substrate film was obtained.

(2) First Bonding Step

Polyvinyl alcohol powders [trade name: "KL-318" manufactured by Kuraray Co., Ltd., an average degree of polymerization of 1800] were dissolved in hot water at 95° C., to prepare a polyvinyl alcohol aqueous solution having a concentration of 3 weight %. A cross-linker [trade name: "Sumirez Resin 650" manufactured by Taoka Chemical Company, Ltd.] was mixed in the obtained aqueous solution by 1 part by weight with respect to 2 parts by weight of the polyvinyl alcohol powders, to prepare a water-soluble adhesive.

By using the gravure coater, the aforementioned water-soluble adhesive was applied to a surface of the polarizing layer of the polarizing laminated film fabricated in (1) above, wherein the surface is a surface on the opposite side of the substrate film. Then, the same second protective film as that used in Reference Example was bonded to the applied surface. Thereafter, drying treatment was performed at 80° C. for 5 minutes. Thus, a five-layer film composed of substrate film/primer layer/polarizing layer/water-soluble adhesive layer/second protective film was obtained. A thickness of the polarizing layer was 6.1 μm.

(3) Separation Step and Second Bonding Step

The substrate film was separated and removed from the five-layer-structure film fabricated in (2) above, to obtain a polarizing plate with the protective film on one surface. The substrate film was able to be separated easily. Next, the same ultraviolet curing adhesive as that used in Reference Example was applied to one surface of the same first protective film as that used in Reference Example by using the micro gravure coater, and this was bonded to the primer layer surface in the aforementioned polarizing plate with the protective film on one surface. Next, irradiation with an ultraviolet ray was performed from the first protective film side under the same conditions as those in Reference Example, to harden the adhesive layer. Thus, a polarizing plate having a configuration similar to that in FIG. 1A was obtained. A thickness of each adhesive layer subjected to curing was 1.0 μm.

Example 2

(1) Fabrication of Polarizing Layer (Polarizing Film)

A polyvinyl alcohol film having an average degree of polymerization of about 2400, a degree of saponification of not lower than 99.9 mol % and a thickness of 30 μm was uniaxially stretched by dry stretching with a stretching magnification of about 4, and was further immersed in purified water at 40° C. for 1 minute with the tension state being maintained, and thereafter, was immersed at 28° C. for 60 seconds in an aqueous solution in which a weight ratio of iodine/potassium iodide/water was 0.05/10/100. Thereafter, the polyvinyl alcohol film was immersed at 68° C. for 300 seconds in an aqueous solution in which a weight ratio of potassium iodide/boric acid/water was 8.5/7.5/100. Subsequently, the polyvinyl alcohol film was cleaned with purified water at 10° C. for 20 seconds, and thereafter, was dried at 65° C. Thus, a polarizing film having iodine adsorbed and oriented in the uniaxially stretched polyvinyl alcohol film was fabricated. A thickness of the polarizing film was 11 μm.

(2) Bonding of Second Protective Film

The same water-soluble adhesive as that used in Example 1 was applied to one surface of the aforementioned polarizing film by using the gravure coater. Then, a second protective film [trade name: "ZEONOR Film ZF14-023", which is a cyclic polyolefin-based resin film manufactured by ZEON Corporation, having a bonding surface thereof subjected to corona treatment] having a thickness of 23 μm was bonded to the applied surface. Thereafter, drying treatment was performed at 40° C. for 1 minute. Thus, a polarizing plate with the protective film on one surface composed of polarizing film/water-soluble adhesive layer/second protective film was obtained.

(3) Bonding of First Protective Film

A first protective film [polyethylene terephthalate film manufactured by Mitsubishi Plastics, Inc., having a bonding surface thereof subjected to corona treatment] having a thickness of 25 μm was prepared, and the same ultraviolet curing adhesive as that used in Reference Example was applied to the corona-treated surface by using the micro gravure coater, and this was bonded to a polarizing film surface of the polarizing plate with the protective film on one surface fabricated in (2) above. Next, irradiation with an ultraviolet ray was performed from the second protective film side under the same conditions as those in Reference Example, to harden the adhesive layer. Thus, a polarizing plate having a configuration similar to that in FIG. 1A was obtained. A thickness of the ultraviolet curing adhesive layer subjected to curing was 1.0 μm.

Comparative Example 2

(1) Fabrication of Polarizing Layer (Polarizing Film)
Similarly to Example 2, a polarizing film was fabricated.

(2) Bonding of First Protective Film and Second Protective Film

The same first protective film [polyethylene terephthalate film manufactured by Mitsubishi Plastics, Inc., having a bonding surface thereof subjected to corona treatment] and the same second protective film ("ZEONOR Film ZF14-023" manufactured by ZEON Corporation, having a bonding surface thereof subjected to corona treatment) as those used in Example 2 were prepared, and the same ultraviolet curing adhesive as that used in Reference Example was applied to each corona-treated surface by using the micro gravure coater, and the first protective film was bonded to one surface of the aforementioned polarizing film and the second protective film was bonded to the opposite surface. Next, irradiation with an ultraviolet ray was performed from the second protective film side under the same conditions as those in Reference Example, to harden the adhesive layer. Thus, a polarizing plate was obtained.

[Evaluation of Polarizing Plate]

(1) Appearance Evaluation of Surface of Polarizing Plate

Figure 8A:
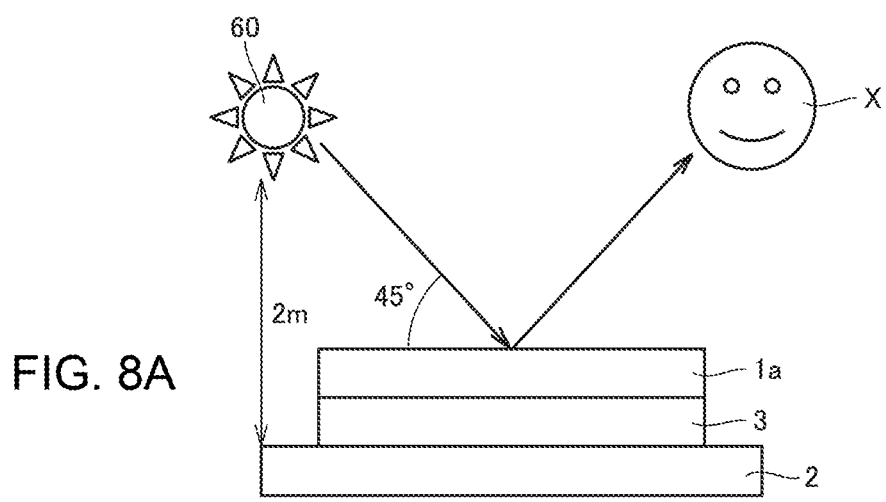
FIGS. 8A-8B are schematic views for describing a method of evaluating an appearance of a surface of the polarizing plate.
Figure 8B:
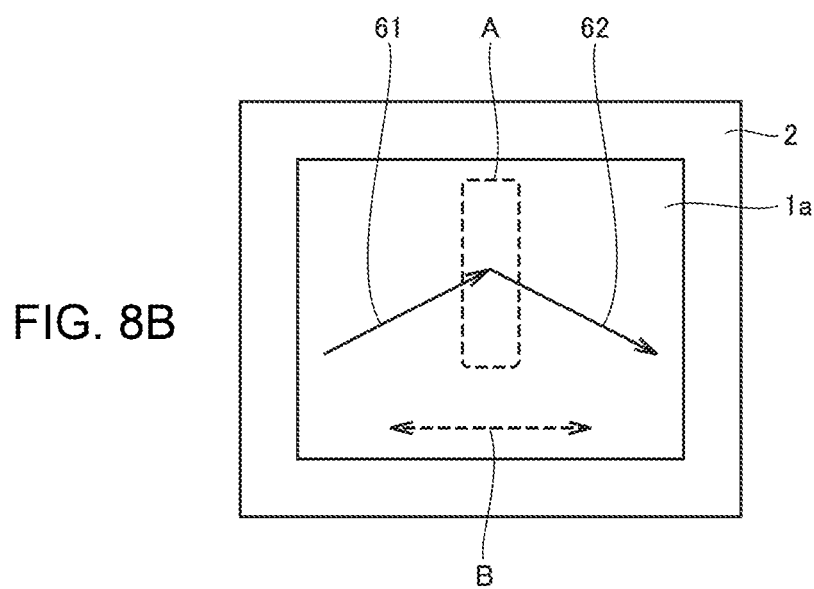

FIGS. 8A-8B are schematic views for describing a method of evaluating an appearance of a surface of a polarizing plate. FIG. 8A is a side view thereof and FIG. 8B is a top view thereof. Referring to FIGS. 8A-8B, appearance evaluation of the surface of the polarizing plate was performed as follows. First, the polarizing plate was cut out into a size of 100 mm in length and 100 mm in width, and this was defined as a sample for evaluation 1a. The first protective film side of this sample for evaluation 1a was bonded to a flat black acrylic plate 2 having a thickness of 2 mm, with transparent pressure sensitive adhesive layer 3 being interposed.

Sample for evaluation 1a bonded to black acrylic plate 2 was placed in a room where a fluorescent lamp 60 is on. A position of fluorescent lamp 60 is at a height of 2 m from black acrylic plate 2. In this state, the light from fluorescent lamp 60 is reflected on a surface of sample for evaluation 1a (the reference numeral 61 represents the incident light incident on the surface of sample for evaluation 1a, and the reference numeral 62 represents the reflected light), and thereby, a region of a reflected image A of the fluorescent lamp appearing on the surface of sample for evaluation 1a was visually observed. Sample for evaluation 1a was placed in such an orientation that a direction of an absorption axis B of a polarizing layer thereof is parallel to a line connecting fluorescent lamp 60 and an observer X.

A result of appearance evaluation of the surface of the polarizing plate is shown in Table 1. In Table 1, A indicates that no circular recessed patterns were observed and the surface of sample for evaluation 1a was observed as being flat, and B indicates that circular recessed patterns were observed. In Comparative Example 1, flaky uneven circular recessed patterns having a diameter of about 1 mm were observed over the entire surface of sample for evaluation 1a.

Figure 9A:
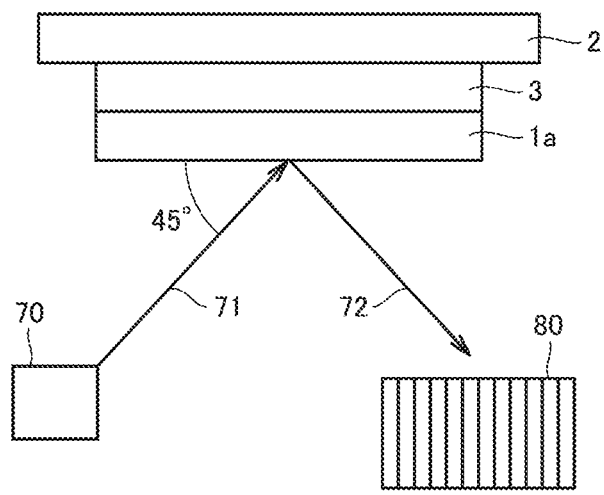
FIGS. 9A-9B are schematic views for describing a method of measuring a reflection sharpness of the polarizing plate.
Figure 9B:
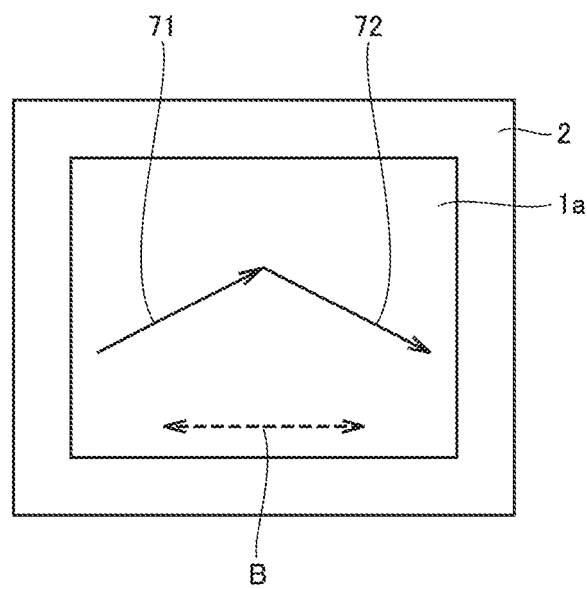

(2) Evaluation of Irregularities on Surface of Polarizing Plate by Measuring Reflection Sharpness FIGS. 9A-9B are schematic views for describing a method of measuring a reflection sharpness of a polarizing plate. FIG. 9A is a side view thereof and FIG. 9B is a top view thereof. Referring to FIGS. 9A-9B, the reflection sharpness of the polarizing plate was measured as follows. First, the polarizing plate was cut out into a size of 100 mm in length and 100 mm in width, and this was defined as sample for evaluation 1a. The first protective film side of this sample for evaluation 1a was bonded to flat black acrylic plate 2 having a thickness of 2 mm, with transparent pressure sensitive adhesive layer 3 being interposed.

The surface of sample for evaluation 1a was irradiated with light (incident light 71) at an incidence angle of 45° from a light source 70 and a quantity of reflected light 72 was measured through an optical comb 80 by using an image clarity measuring device, "ICM-1T", manufactured by Suga Test Instruments Co., Ltd., in accordance with the section of "Reflection Method" in JIS K7374 [Plastics: Determination of image clarity]. Thus, the reflection sharpness (%) was determined as to sample for evaluation 1a bonded to black acrylic plate 2 described above. A width of the optical comb was 0.125 mm. Sample for evaluation 1a was placed in such an orientation that a direction of absorption axis B of a polarizing layer thereof is parallel to a plane including incident light 71 and reflected light 72 to be detected. As a flatness of the surface of sample for evaluation 1a becomes higher, the reflection sharpness becomes greater. A result of measurement of the reflection sharpness is shown in Table 1.

TABLE 1

|  | Appearance Evaluation | Reflection Sharpness (%) |
| --- | --- | --- |
| Reference Example | A | 32.7 |
| Comparative Example 1 | B | 12.1 |
| Example 1 | A | 52.7 |
| Example 2 | A | 27.6 |
| Comparative Example 2 | B | 3.7 |

Figure 10A:
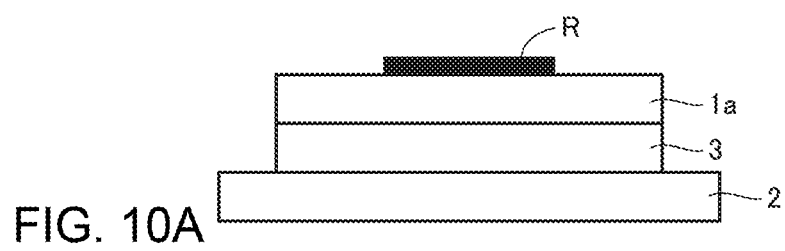
FIGS. 10A-10B are schematic views for describing a method of measuring a surface shape of the polarizing plate.
Figure 10B:
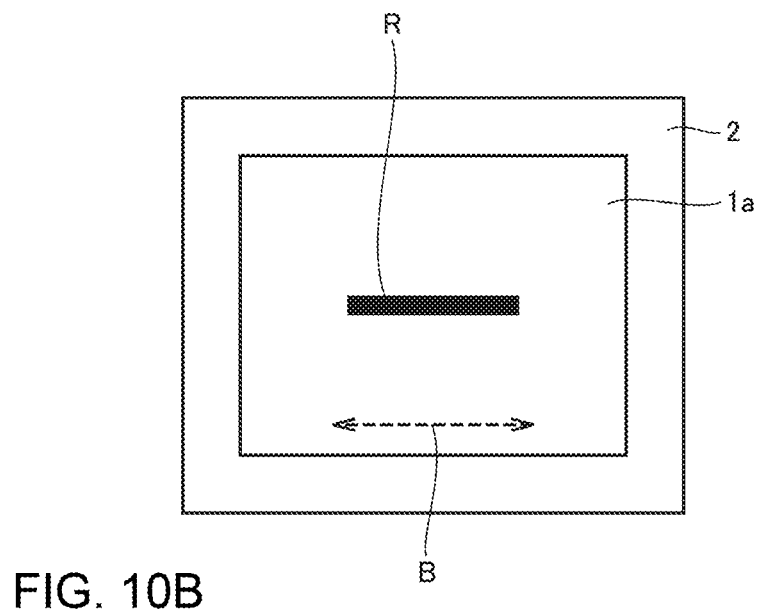

(3) Evaluation of Irregularities on Surface of Polarizing Plate by Measuring Surface Shape FIGS. 10A-10B are schematic views for describing a method of measuring a surface shape of a polarizing plate. FIG. 10A is a side view thereof and FIG. 10B is a top view thereof. Referring to FIGS. 10A-10B, the surface shape of the polarizing plate was measured as follows. First, the polarizing plate was cut out into a size of 100 mm in length and 100 mm in width, and this was defined as sample for evaluation 1a. The first protective film side of this sample for evaluation 1a was bonded to flat black acrylic plate 2 having a thickness of 2 mm, with transparent pressure sensitive adhesive layer 3 being interposed.

By using "Imaging Profiler PLµ2300" manufactured by SENSOFAR Inc., a change in height of a surface of sample for evaluation 1a was measured over a length of 8000 µm (a measurement spot R in FIGS. 10A-10B) by a confocal mode. From the obtained result, arithmetic average roughness Ra (nm) which is a parameter of a surface roughness, a maximum valley depth PV (nm) of a cross section curve, and a root mean square roughness Rms (nm) were determined. A result of evaluation about the polarizing plates obtained in Reference Example, Comparative Example 1, Example 1, and Example 2 is shown in Table 2.

TABLE 2

|  | Ra (nm) | PV (nm) | Rms (nm) |
| --- | --- | --- | --- |
| Reference Example | 62 | 472 | 80 |
| Comparative Example 1 | 111 | 628 | 133 |
| Example 1 | 69 | 422 | 82 |
| Example 2 | 74 | 482 | 86 |

(4) Measurement of Shrinkage Force of Polarizing Layer Constituting Polarizing Plate The first and second protective films of the polarizing plate obtained in Example 2 was dissolved and only the polarizing layer was taken out to measure the heat shrinkage force in a direction of an absorption axis thereof (a direction of stretching). In measurement, with the direction of the stretching absorption axis being a longer side, a film of 2 mm in width and 8 mm in length was cut out and was defined as a sample for measurement. This sample was placed in a thermo-mechanical analyzer (TMA) ["EXSTAR-6000" manufactured by SII NanoTechnology Inc.], and the shrinkage force in a direction of the length of 8 mm generated when the sample was heated at 80° C. for 240 minutes with the dimension being kept constant was measured. The shrinkage force was 1.7 N.

REFERENCE SIGNS LIST 1 polarizing plate; 1a sample for evaluation; 2 black acrylic plate; 3 transparent pressure sensitive adhesive layer; 4 substrate; 5 polarizing layer; 6 polyvinyl alcohol-based resin layer; 6' stretched polyvinyl alcohol-based resin layer; 8 liquid crystal cell; 9 organic electroluminescence display element; 10 first protective film; 15 first adhesive layer; 20 second protective film; 25 second adhesive layer; 30 substrate film; 30' stretched substrate film; 40 back-side polarizing plate; 50 backlight; 60 fluorescent lamp; 61 incident light; 62 reflected light; 70 light source; 71 incident light; 72 reflected light; 80 optical comb; 100 laminated film; 200 stretched film; 300 polarizing laminated film; 400 bonded film; 500 polarizing plate with protective film on one surface; A reflected image of fluorescent lamp; B absorption axis of polarizing layer; R measurement spot; X observer.

The invention claimed is:

1. A method for manufacturing a polarizing plate assembly, comprising a polarizing plate and a transparent pressure sensitive adhesive layer, the method comprising in the following order:
    bonding one protective film to one surface of a polarizing layer having a thickness not greater than 20 µm, with a water-soluble adhesive interposed therebetween, to form a film stack;
    drying the film stack;
    bonding an additional protective film to the other surface of the polarizing layer, with an active energy ray curing adhesive interposed therebetween to obtain the polarizing plate; and
    providing the transparent pressure sensitive adhesive layer on a side of the additional protective film of the polarizing plate.

2. The method according to claim 1, wherein at least one of the one protective film and the additional protective film has a moisture permeability not higher than 1000 g/m²/24 hr.

3. The method according to claim 1, wherein the second one protective film has a moisture permeability of 10 to 1000 g/m²/24 hr.

4. The method according to claim 1, wherein the polarizing layer is a stretched polyvinyl alcohol-based resin layer containing a dichroic colorant.

5. The method according to claim 1, wherein the polarizing layer has a thickness not greater than 10 µm.

6. The method according to claim 1, wherein the polarizing plate has a rectangular shape having a diagonal length of 3 to 32 cm.

7. The method according to claim 1, wherein the polarizing plate further comprises a surface treatment layer stacked on a surface of the one protective film or the additional protective film, the surface being a surface on an opposite side of the polarizing layer.

8. The method according to claim 7, wherein the surface treatment layer is a hard coat layer, an antireflective layer or an electroconductive layer.

9. The method according to claim 1, wherein the one protective film or the additional protective film has a thickness not greater than 50 μm.

10. The method according to claim 1, wherein a tensile elastic modulus at 80° C. of the one protective film or the additional protective film is not lower than 1500 MPa.

11. A method for manufacturing a polarizing plate assembly, comprising a polarizing plate and a transparent pressure sensitive adhesive layer, the method comprising:
bonding one protective film on a polarizing layer having a thickness not greater than 20 μm of a polarizing laminated film, with a water-soluble adhesive interposed therebetween to obtain a bonded film comprising a substrate film and the polarizing layer;
drying the bonded film;
separating the substrate film from the bonded film to obtain a polarizing plate with the one protective film;
bonding an additional protective film on the polarizing layer of the polarizing plate with the one protective film, with an active energy ray curing adhesive interposed therebetween; and
providing the transparent pressure sensitive adhesive layer on a side of the additional protective film of the polarizing plate.

12. The method according to claim 11, wherein at least one of the one protective film and the additional protective film has a moisture permeability not higher than 1000 $g/m^2/24$ hr.

13. The method according to claim 11, wherein the one protective film has a moisture permeability of 10 to 1000 $g/m^2/24$ hr.

14. The method according to claim 11, wherein the polarizing layer is a stretched polyvinyl alcohol-based resin layer containing a dichroic colorant.

15. The method according to claim 11, wherein the polarizing layer has a thickness not greater than 10 μm.

16. The method according to claim 11, wherein the polarizing plate has a rectangular shape having a diagonal length of 3 to 32 cm.

17. The method according to claim 11, wherein the polarizing plate further comprises a surface treatment layer stacked on a surface of the one protective film or the additional protective film, the surface being a surface on an opposite side of the polarizing layer.

18. The method according to claim 17, wherein the surface treatment layer is a hard coat layer, an antireflective layer or an electroconductive layer.

19. The method according to claim 11, wherein the one protective film or the additional protective film has a thickness not greater than 50 μm.

20. The method according to claim 11, wherein a tensile elastic modulus at 80° C. of the one protective film or the additional protective film is not lower than 1500 MPa.

* * * * *